(12) United States Patent
Liu

(10) Patent No.: US 8,773,687 B2
(45) Date of Patent: Jul. 8, 2014

(54) DRIVERLESS ARCHITECTURE FOR PRINTING SYSTEMS

(75) Inventor: Yue Liu, Milpitas, CA (US)

(73) Assignee: Ricoh Company, Ltd., Tokyo (JP)

( * ) Notice: Subject to any disclaimer, the term of this patent is extended or adjusted under 35 U.S.C. 154(b) by 687 days.

(21) Appl. No.: 12/399,799

(22) Filed: Mar. 6, 2009

(65) Prior Publication Data

US 2010/0225957 A1 Sep. 9, 2010

(51) Int. Cl.
*G06F 3/12* (2006.01)

(52) U.S. Cl.
USPC .............................. 358/1.15; 710/15

(58) Field of Classification Search
USPC .................. 719/321; 358/1.1, 1.15, 1.16
See application file for complete search history.

(56) References Cited

U.S. PATENT DOCUMENTS

| | | | |
|---|---|---|---|
| 5,467,434 A | 11/1995 | Hower et al. |
| 5,487,168 A | 1/1996 | Geiner et al. |
| 5,513,126 A | 4/1996 | Harkins et al. |
| 5,692,111 A | 11/1997 | Marbry et al. |
| 5,768,483 A | 6/1998 | Maniwa et al. |
| 5,845,076 A | 12/1998 | Arakawa |
| 5,875,350 A | 2/1999 | Comp et al. |
| 5,996,029 A | 11/1999 | Sugiyama et al. |
| 5,999,945 A | 12/1999 | Lahey et al. |
| 6,054,922 A | 4/2000 | Smith |
| 6,148,346 A | 11/2000 | Hanson |
| 6,232,877 B1 | 5/2001 | Ashwin |
| 6,351,320 B1 | 2/2002 | Shin |
| 6,421,135 B1 | 7/2002 | Fresk et al. |
| 6,453,127 B2 | 9/2002 | Wood et al. |
| 6,501,472 B1 | 12/2002 | Hunt et al. |
| 6,631,010 B1 | 10/2003 | Foster et al. |
| 6,789,111 B1 | 9/2004 | Brockway et al. |
| 6,825,941 B1 | 11/2004 | Nguyen |
| 6,898,624 B2 | 5/2005 | Young et al. |
| 6,952,831 B1 | 10/2005 | Moore |
| 6,967,728 B1 | 11/2005 | Vidyanand |

(Continued)

FOREIGN PATENT DOCUMENTS

| | | |
|---|---|---|
| EP | 1 209 558 A2 | 5/2002 |
| EP | 1 491 993 A2 | 12/2004 |

(Continued)

OTHER PUBLICATIONS

European Patent Office, "European Search Report", application No. EP 07250298, dated Feb. 23, 2010, 8 pages.

(Continued)

*Primary Examiner* — Marivelisse Santiago Cordero
*Assistant Examiner* — Lawrence Wills
(74) *Attorney, Agent, or Firm* — Hickman Palermo Truong Becker Bingham Wong LLP; Edward A. Becker

(57) ABSTRACT

Techniques are provided for allowing an application program to print to a new or updated printing device on a network without the user having to perform any updates or reconfigurations that are required with conventional print drivers. The techniques include techniques for retrieving new or updated printing device capabilities data from the printing device on the network, converting the retrieved printing device capabilities to a printer description file, generating print job tickets based on the printer description file, and submitting the print job tickets to the printing device as part of the submission of print jobs to the printing device.

20 Claims, 20 Drawing Sheets

(56) References Cited

U.S. PATENT DOCUMENTS

| | | | |
|---|---|---|---|
| 6,975,820 | B2 | 12/2005 | Wong |
| 7,002,703 | B2 | 2/2006 | Parry |
| 7,082,574 | B2 | 7/2006 | Ogino et al. |
| 7,120,910 | B2 | 10/2006 | Matsuda et al. |
| 7,136,941 | B2 * | 11/2006 | Nguyen et al. ............... 710/15 |
| 7,143,150 | B1 | 11/2006 | Nuggehalli |
| 7,162,518 | B2 | 1/2007 | Takahashi |
| 7,174,534 | B2 | 2/2007 | Chong et al. |
| 7,180,616 | B2 | 2/2007 | Miyoshi et al. |
| 7,271,727 | B2 | 9/2007 | Steeves |
| 7,312,887 | B2 | 12/2007 | Wu |
| 7,321,443 | B2 * | 1/2008 | Berkema et al. ............ 358/1.16 |
| 7,522,299 | B2 * | 4/2009 | Nguyen et al. ............... 358/1.15 |
| 7,605,396 | B2 | 10/2009 | Nakamura |
| 7,633,403 | B2 | 12/2009 | Abe et al. |
| 7,728,999 | B2 | 6/2010 | White et al. |
| 7,809,807 | B2 * | 10/2010 | Tominaga ................... 709/220 |
| 7,849,094 | B2 | 12/2010 | Arai |
| 7,880,923 | B2 | 2/2011 | Kato |
| 7,999,951 | B2 | 8/2011 | Ferlitsch |
| 8,056,143 | B2 | 11/2011 | Brown et al. |
| 8,099,486 | B2 | 1/2012 | Nakamura et al. |
| 8,149,431 | B2 | 4/2012 | Barton et al. |
| 8,243,294 | B2 | 8/2012 | Herrmann et al. |
| 2001/0050684 | A1 | 12/2001 | Smith |
| 2002/0030840 | A1 | 3/2002 | Itaki et al. |
| 2002/0054339 | A1 | 5/2002 | Arakawa |
| 2002/0078160 | A1 | 6/2002 | Kemp et al. |
| 2002/0120742 | A1 | 8/2002 | Cherry |
| 2002/0171857 | A1 | 11/2002 | Hisatomi et al. |
| 2002/0174444 | A1 | 11/2002 | Gatto et al. |
| 2002/0184294 | A1 | 12/2002 | Volkoff et al. |
| 2003/0030664 | A1 | 2/2003 | Parry |
| 2003/0033368 | A1 | 2/2003 | Tominaga |
| 2003/0160989 | A1 | 8/2003 | Chapin et al. |
| 2003/0174357 | A1 | 9/2003 | Lester et al. |
| 2003/0184782 | A1 | 10/2003 | Perkins et al. |
| 2004/0019628 | A1 | 1/2004 | Puri et al. |
| 2004/0111418 | A1 | 6/2004 | Nguyen et al. |
| 2004/0130744 | A1 | 7/2004 | Wu et al. |
| 2004/0179231 | A1 | 9/2004 | Savino et al. |
| 2004/0215665 | A1 | 10/2004 | Edgar et al. |
| 2004/0218201 | A1 | 11/2004 | Lermant et al. |
| 2004/0246505 | A1 | 12/2004 | Oh |
| 2004/0263900 | A1 | 12/2004 | Nguyen et al. |
| 2005/0030557 | A1 | 2/2005 | Wiechers |
| 2005/0030577 | A1 | 2/2005 | Wiechers |
| 2005/0043846 | A1 | 2/2005 | Wiechers |
| 2005/0046886 | A1 | 3/2005 | Ferlitsch |
| 2005/0099650 | A1 | 5/2005 | Brown et al. |
| 2005/0111029 | A1 | 5/2005 | Dehart |
| 2005/0162688 | A1 | 7/2005 | Nakoka et al. |
| 2005/0180770 | A1 | 8/2005 | Wong |
| 2005/0210227 | A1 | 9/2005 | Emerson |
| 2005/0213136 | A1 | 9/2005 | Noyama et al. |
| 2005/0223390 | A1 * | 10/2005 | Moore ........................ 719/321 |
| 2005/0225795 | A1 | 10/2005 | Nuggehalli et al. |
| 2006/0023244 | A1 | 2/2006 | Mitsui |
| 2006/0029414 | A1 | 2/2006 | Wong |
| 2006/0087682 | A1 | 4/2006 | Lee |
| 2006/0114493 | A1 | 6/2006 | Slightam |
| 2006/0120349 | A1 | 6/2006 | Taylor et al. |
| 2006/0221372 | A1 | 10/2006 | Onishi et al. |
| 2006/0221391 | A1 | 10/2006 | Okazawa et al. |
| 2006/0268328 | A1 | 11/2006 | Park et al. |
| 2007/0002355 | A1 | 1/2007 | Kai |
| 2007/0002368 | A1 | 1/2007 | Corona |
| 2007/0008560 | A1 | 1/2007 | Eschbach |
| 2007/0013935 | A1 | 1/2007 | Uchida |
| 2007/0052992 | A1 | 3/2007 | Yamada |
| 2007/0086023 | A1 * | 4/2007 | Kadota ........................ 358/1.1 |
| 2007/0097399 | A1 | 5/2007 | Boyd et al. |
| 2007/0136485 | A1 | 6/2007 | Mitsui |
| 2007/0174521 | A1 | 7/2007 | Aritomi |
| 2007/0214409 | A1 | 9/2007 | Miyata |
| 2007/0263242 | A1 | 11/2007 | Takahashi |
| 2008/0007742 | A1 | 1/2008 | Abe et al. |
| 2008/0037062 | A1 | 2/2008 | Omino et al. |
| 2008/0059978 | A1 | 3/2008 | Nishio |
| 2008/0068635 | A1 | 3/2008 | Asano |
| 2008/0180728 | A1 | 7/2008 | Sekine |
| 2008/0192121 | A1 | 8/2008 | Hashimoto |
| 2008/0231886 | A1 * | 9/2008 | Wehner et al. ............... 358/1.15 |
| 2008/0239373 | A1 | 10/2008 | Suzuki |
| 2008/0297838 | A1 | 12/2008 | Matsui et al. |
| 2008/0301277 | A1 | 12/2008 | Tsujiguchi |
| 2009/0040549 | A1 | 2/2009 | Miyamoto |
| 2009/0063710 | A1 | 3/2009 | Sekine et al. |
| 2009/0063718 | A1 | 3/2009 | Sekine et al. |
| 2009/0094539 | A1 | 4/2009 | Wang et al. |
| 2009/0109473 | A1 | 4/2009 | Kato |
| 2009/0190150 | A1 | 7/2009 | Selvaraj |
| 2010/0027040 | A1 | 2/2010 | Kuroda |
| 2010/0082782 | A1 | 4/2010 | Ding |
| 2010/0100832 | A1 | 4/2010 | Wang |
| 2010/0188688 | A1 | 7/2010 | Selvaraj et al. |
| 2010/0225933 | A1 | 9/2010 | Xiao et al. |
| 2010/0225958 | A1 | 9/2010 | Selvaraj et al. |
| 2010/0225959 | A1 | 9/2010 | Selvaraj et al. |
| 2011/0026073 | A1 | 2/2011 | Wu |

FOREIGN PATENT DOCUMENTS

| | | |
|---|---|---|
| EP | 1 271 301 A2 | 2/2005 |
| GB | 2347766 | 9/2000 |
| JP | 2002-014786 | 1/2002 |
| JP | 2002024495 A | 1/2002 |
| JP | 2002331730 A | 11/2002 |
| JP | 2003233482 A | 8/2003 |
| JP | 2005031956 A | 2/2005 |
| JP | 2005148953 A | 6/2005 |
| JP | 2005228148 A | 8/2005 |
| JP | 2006/024199 A | 1/2006 |
| JP | 20061855289 A | 6/2006 |
| JP | 2007-034899 | 8/2007 |
| JP | 2007-200247 | 8/2007 |
| JP | 2008219419 A | 9/2008 |
| JP | 2008269485 A | 11/2008 |
| WO | WO 2004/070607 A1 | 8/2004 |

OTHER PUBLICATIONS

Systems Inc., "PostScript Printer Description File Format Specification 4.3—Chapters 1 & 2", Internet Citation, XP002158174, retrieved from http://partners.adobe.com/asn/developer/pdfs/tn/5003.PPD_Spec_v4.3.pdf, 18 pages.

European Patent Office, "European Search Report", application No. EP 09151185, 8 pages.

Device Driver. Wikipedia, the free encyclopedia. [retrieved on Sep. 8, 2008]. pp. 1-4. Retrieved from the Internet: <URL: http://en.wikipedia.org/wiki/Device_driver>.

Page Description Language. Wikipedia, the free encyclopedia. [retrieved on Sep. 8, 2008]. pp. 1. Retrieved from the Internet: <URL: http://en.wikipedia.org/wiki/Page_description_language>.

European Patent Office, "European Search Report", application No. 08163180.6-2211, dated Nov. 11, 2008, 10 pages.

Katayama et al., "Prototype of the device driver generation system for unix-like operating systems", Principles of Software Evolution, 2000, XP 010537526, 10 pages.

Katayama et al., "Proposal of a support system for device driver generation", Software Engineering conference, 1999, APSEC 1999 proceedings, XP010363982, 4 pages.

Sweet, Michael, "An Overview of the Commom UNIX Printing System", Easy Software Products, XP002501773, Jul. 2000, 8 pages.

Shaojie, Wang, et al., "Synthesizing operating system based device drivers in embedded systems", International Conference on Hardware/Software Codesign and system Synthesis, Oct. 2003, XP010688137, 8 pages.

European Patent Office, "European Search Report", application No. EP 08163260, dated Dec. 15, 2008, 9 pages.

(56) References Cited

OTHER PUBLICATIONS

U.S. Appl. No. 12/019,610, filed Jan. 24, 2008, Final Office Action, Mail Date Sep. 26, 2012.
U.S. Appl. No. 12/253,823, filed Oct. 17, 2008, Notice of Allowance, Mail Date May 15, 2012.
U.S. Appl. No. 12/399,891, filed Mar. 6, 2009, Office Action, Mail Date Jun. 6, 2012.
U.S. Appl. No. 12/399,895, filed Jun. 19, 2012, Office Action, Mail Date Jun. 19, 2012.
U.S. Appl. No. 12/399,884, filed Mar. 6, 2009, Office Action, Mail Date Jun. 21, 2012.
U.S. Appl. No. 12/534,749, filed Aug. 3, 2009, Notice of Allowance, Jun. 28, 2012.
Xerox, Xerox 4595 Copier/Printer System Administration Guide, Jan. 2008, pp. 1-402.
U.S. Appl. No. 11/845,926, filed Aug. 29, 2007, Interview Summary, Mail Date Jul. 25, 2013.
U.S. Appl. No. 11/845,926, filed Aug. 29, 2007, Notice of Allowance, Aug. 16, 2013.
European Patent Office, "Office Action" in Application No. 09 151 185.7, dated May 9, 2012, 8 pages.
U.S. Appl. No. 12/399,884, filed Mar. 6, 2009, Final Office Action, Dec. 23, 2013.
U.S. Appl. No. 12/399,891, filed Mar. 6, 2009, Notice of Allowance, Mail Date Mar. 14, 2013.
U.S. Appl. No. 12/399,884, filed Mar. 6, 2009, Advisory Action, Mail Date Feb. 12, 2013.
U.S. Appl. No. 12/253,823, filed Oct. 27, 2008, Final Office Action, Mail Date Feb. 17, 2012.
U.S. Appl. No. 11/846,884, filed Aug. 29, 2007, Notice of Allowance, Mail Date Mar. 1, 2012.
U.S. Appl. No. 12/534,749, filed Aug. 3, 2009, Office Action, Mail Date Mar. 23, 2012.
U.S. Appl. No. 12/019,610, filed Jan. 24, 2008, Office Action, Mail Date Mar. 30, 2012.
U.S. Appl. No. 12/399,884, filed Mar. 6, 2009, Final Office Action, Mail Date Nov. 26, 2012.
U.S. Appl. No. 12/399,891, filed Mar. 6, 2009, Final Office Action, Mail Date Nov. 28, 2012.
U.S. Appl. No. 12/399,895, filed Mar. 6, 2009, Notice of Allowance, Mail Date Jan. 2, 2013.
U.S. Appl. No. 12/253,823, filed Oct. 17, 2008, Final Office Action, Mail Date Aug. 31, 2011.
U.S. Appl. No. 11/846,884, filed Aug. 29, 2007, Advisory Action, Mail Date Sep. 19, 2011.
U.S. Appl. No. 11/846,926, filed Aug. 29, 2007, Interview Summary, Mail Date Sep. 21, 2011.
U.S. Appl. No. 11/846,884, filed Aug. 29, 2007, Office Action, Mail Date Oct. 26, 2011.
U.S. Appl. No. 11/846,869, filed Aug. 29, 2007, Final Office Action, Mail Date Oct. 27, 2011.
U.S. Appl. No. 12/360,794, filed Jan. 27, 2009, Notice of Allowance, Mail Date Jan. 25, 2013.
European Patent Office, "Search Report" in application No. 07 250 298.2-1959, dated Jan. 24, 2014, 6 pages.

* cited by examiner

100

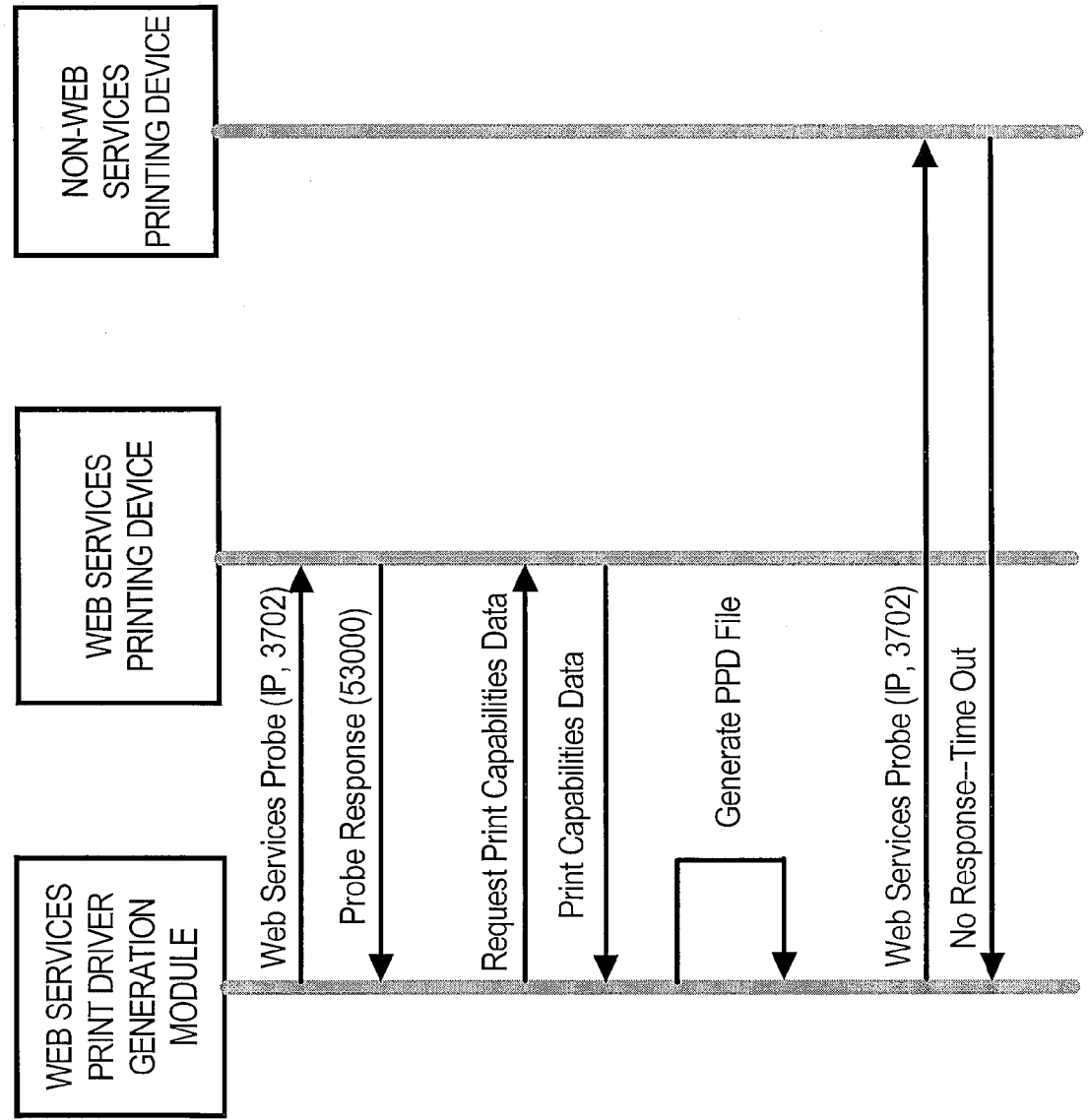

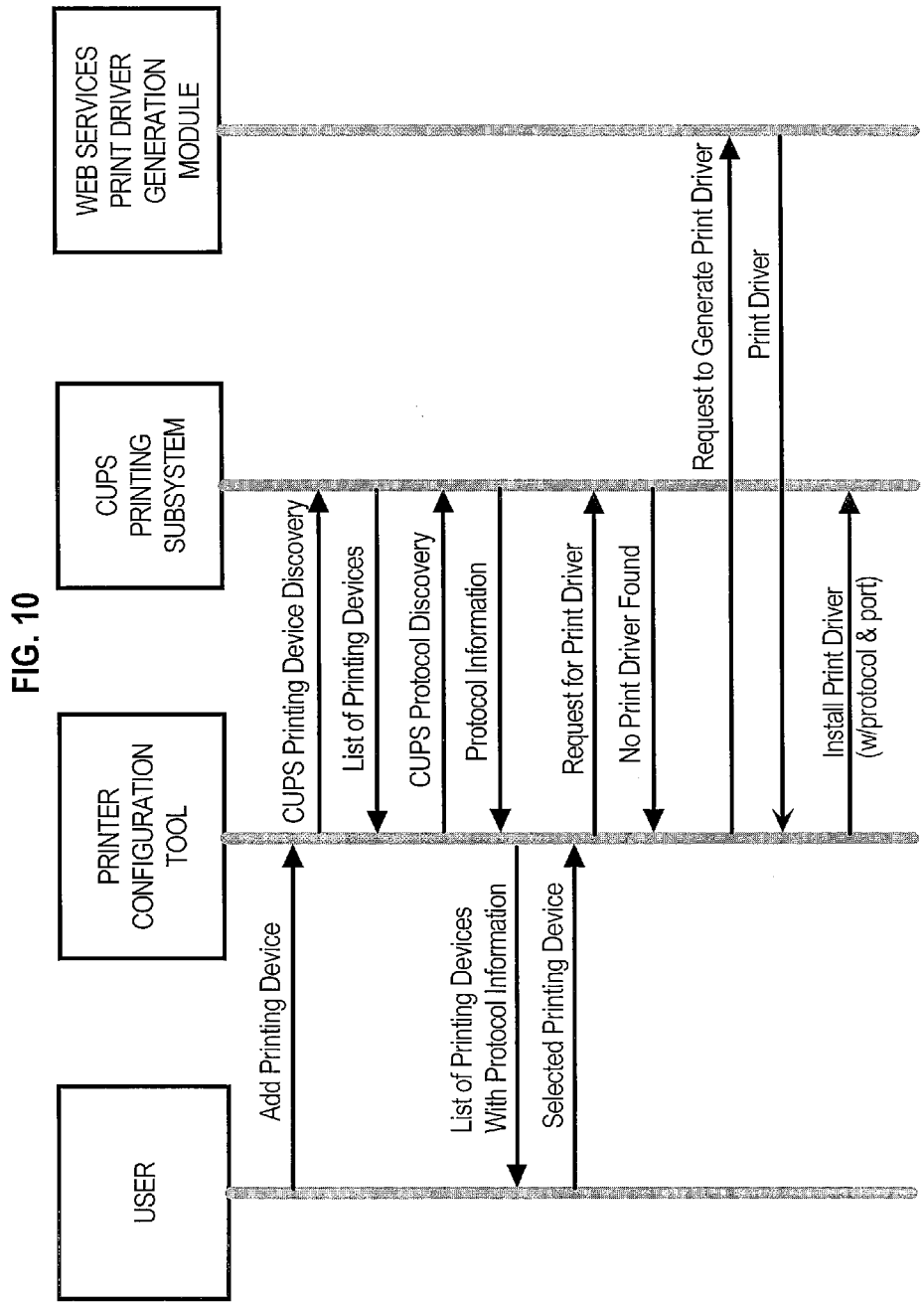

FIG. 11

EXAMPLE PPD FILE

*OpenUI *Sides/Sides: PickOne
*FoomaticRIPOption Sides: enum JCL A
*OrderDependency: 10 AnySetup *Sides
*DefaultSides: OneSided
*Sides OneSided: "%% FoomaticRIPOptionSetting: Sides=OneSided"
*FoomaticRIPOptionSetting Sides=OneSided: "@PJL SET DUPLEX=OFF"
*Sides TwoSidedLongEdge: "%% FoomaticRIPOptionSetting: Sides=TwoSidedLongEdge"
*FoomaticRIPOptionSetting Sides=TwoSidedLongEdge: "@PJL SET DUPLEX=ON\n@PJL SET BINDING=LONGEDGE"
*Sides TwoSidedShortEdge: "%% FoomaticRIPOptionSetting: Sides=TwoSidedShortEdge"
*FoomaticRIPOptionSetting Sides=TwoSidedShortEdge: "@PJL SET DUPLEX=ON\n@PJL SET BINDING=SHORTEDGE"
*CloseUI: *Sides

FIG. 12A

PRINTING DEVICE CAPABILITIES DATA

```
<soap:Envelope>

<soap:Header>

<wsa:To>
http://schemas.xmlsoap.org/ws/2004/08/addressing/role/anonymous
</wsa:To>

<wsa:Action>
http://schemas.microsoft.com/windows/2006/08/wdp/print/GetPrinterElementsResponse
</wsa:Action>
<wsa:MessageID>uuid:UniqueMsgId</wsa:MessageID>
<wsa:RelatesTo>uuid:MsgIdOfTheGetPrinterElementsRequest</wsa:RelatesTo>
</soap:Header>

<soap:Body>

<wprt:GetPrinterElementsResponse>

<wprt:ElementData Name="wprt:PrinterCapabilities" Valid="true">

<wprt:PrinterCapabilities>

<wprt:JobValues>

<wprt:JobProcessing>

<wprt:Copies>
<wprt:MinValue>1</wprt:MinValue>
<wprt:MaxValue>999</wprt:MaxValue>
</wprt:Copies>

<wprt:JobFinishings>
<wprt:Collate>false</wprt:Collate>
<wprt:JogOffset>false</wprt:JogOffset>

<wprt:Staple>

<wprt:Location>
<wprt:AllowedValue>unknown</wprt:AllowedValue>
</wprt:Location>

<wprt:Angle>
<wprt:AllowedValue>unknown</wprt:AllowedValue>
</wprt:Angle>
</wprt:Staple>

<wprt:HolePunch>

<wprt:Edge>
<wprt:AllowedValue>unknown</wprt:AllowedValue>
</wprt:Edge>
```

FIG. 12B

```
<wprt:Pattern>
<wprt:AllowedValue>unknown</wprt:AllowedValue>
</wprt:Pattern>
</wprt:HolePunch>
</wprt:JobFinishings>
-
<wprt:Priority>
<wprt:MinValue>1</wprt:MinValue>
<wprt:MaxValue>100</wprt:MaxValue>
</wprt:Priority>
</wprt:JobProcessing>
-
<wprt:DocumentProcessing>
-
<wprt:Orientation>
<wprt:AllowedValue>Landscape</wprt:AllowedValue>
<wprt:AllowedValue>Portrait</wprt:AllowedValue>
</wprt:Orientation>
-
<wprt:Sides>
<wprt:AllowedValue>OneSided</wprt:AllowedValue>
<wprt:AllowedValue>TwoSidedLongEdge</wprt:AllowedValue>
<wprt:AllowedValue>TwoSidedShortEdge</wprt:AllowedValue>
</wprt:Sides>
-
<wprt:PrintQuality>
<wprt:AllowedValue>Normal</wprt:AllowedValue>
</wprt:PrintQuality>
-
<wprt:MediaType>
<wprt:AllowedValue>Auto</wprt:AllowedValue>
<wprt:AllowedValue>STANDARD</wprt:AllowedValue>
<wprt:AllowedValue>Recycled</wprt:AllowedValue>
<wprt:AllowedValue>Special</wprt:AllowedValue>
<wprt:AllowedValue>Thick</wprt:AllowedValue>
<wprt:AllowedValue>TRANSPARENCY</wprt:AllowedValue>
<wprt:AllowedValue>Color</wprt:AllowedValue>
<wprt:AllowedValue>Letterhead</wprt:AllowedValue>
<wprt:AllowedValue>Preprinted</wprt:AllowedValue>
<wprt:AllowedValue>Labels</wprt:AllowedValue>
<wprt:AllowedValue>Plain_Duplex_Backside</wprt:AllowedValue>
<wprt:AllowedValue>Thick_Duplex_Backside</wprt:AllowedValue>
</wprt:MediaType>
-
```

FIG. 12C

```
<wprt:MediaSizeName>
<wprt:AllowedValue>na_arch-b_12x18in</wprt:AllowedValue>
<wprt:AllowedValue>na_ledger_11x17in</wprt:AllowedValue>
<wprt:AllowedValue>na_legal_8.5x14in</wprt:AllowedValue>
<wprt:AllowedValue>na_letter_8.5x11in</wprt:AllowedValue>
<wprt:AllowedValue>na_executive_7.25x10.5in</wprt:AllowedValue>
<wprt:AllowedValue>na_invoice_5.5x8.5in</wprt:AllowedValue>
<wprt:AllowedValue>iso_a3_297x420mm</wprt:AllowedValue>
<wprt:AllowedValue>iso_a4_210x297mm</wprt:AllowedValue>
<wprt:AllowedValue>iso_a5_148x210mm</wprt:AllowedValue>
<wprt:AllowedValue>iso_a6_105x148mm</wprt:AllowedValue>
<wprt:AllowedValue>jis_b4_257x364mm</wprt:AllowedValue>
<wprt:AllowedValue>jis_b5_182x257mm</wprt:AllowedValue>
<wprt:AllowedValue>na_number-10_4.125x9.5in</wprt:AllowedValue>
<wprt:AllowedValue>iso_dl_110x220mm</wprt:AllowedValue>
<wprt:AllowedValue>na_monarch_3.875x7.5in</wprt:AllowedValue>
<wprt:AllowedValue>iso_c5_162x229mm</wprt:AllowedValue>
<wprt:AllowedValue>iso_c6_114x162mm</wprt:AllowedValue>
<wprt:AllowedValue>na_foolscap_8.5x13in</wprt:AllowedValue>
<wprt:AllowedValue>na_unknown_8.25x13in</wprt:AllowedValue>
<wprt:AllowedValue>na_govt-legal_8x13in</wprt:AllowedValue>
<wprt:AllowedValue>om_pa-kai_267x389mm</wprt:AllowedValue>
<wprt:AllowedValue>prc_16k_146x215mm</wprt:AllowedValue>
<wprt:AllowedValue>custom_papersize</wprt:AllowedValue>
</wprt:MediaSizeName>
-
<wprt:MediaColor>
<wprt:AllowedValue>unknown</wprt:AllowedValue>
</wprt:MediaColor>
-
<wprt:NumberUp>
-
<wprt:PagesPerSheet>
<wprt:AllowedValue>1</wprt:AllowedValue>
<wprt:AllowedValue>2</wprt:AllowedValue>
<wprt:AllowedValue>4</wprt:AllowedValue>
<wprt:AllowedValue>9</wprt:AllowedValue>
<wprt:AllowedValue>16</wprt:AllowedValue>
</wprt:PagesPerSheet>
-
<wprt:Direction>
<wprt:AllowedValue>RightDown</wprt:AllowedValue>
<wprt:AllowedValue>DownRight</wprt:AllowedValue>
<wprt:AllowedValue>LeftDown</wprt:AllowedValue>
<wprt:AllowedValue>DownLeft</wprt:AllowedValue>
</wprt:Direction>
</wprt:NumberUp>
-
<wprt:Resolution>
-
<wprt:AllowedValue>
<wprt:Width>600</wprt:Width>
</wprt:AllowedValue>
-
<wprt:AllowedValue>
<wprt:Width>1200</wprt:Width>
</wprt:AllowedValue>
</wprt:Resolution>
```

FIG. 12D

```
<wprt:PrintQuality>
<wprt:AllowedValue>unknown</wprt:AllowedValue>
</wprt:PrintQuality>
</wprt:DocumentProcessing>
</wprt:JobValues>
-
<wprt:DocumentValues>
-
<wprt:DocumentDescription>
-
<wprt:Compression>
<wprt:AllowedValue>None</wprt:AllowedValue>
</wprt:Compression>
-
<wprt:Format>
<wprt:AllowedValue>application/octet-stream</wprt:AllowedValue>
<wprt:AllowedValue>unknown</wprt:AllowedValue>
</wprt:Format>
</wprt:DocumentDescription>
</wprt:DocumentValues>
</wprt:PrinterCapabilities>
</wprt:ElementData>
</wprt:GetPrinterElementsResponse>
</soap:Body>
</soap:Envelope>
```

FIG. 13

DEFAULT PRINT TICKET FILE

```xml
<?xml version="1.0" encoding="UTF-8" standalone="no" ?>
- <PrintTicket xmlns="http://schemas.microsoft.com/windows/2006/08/wdp/print">
 - <JobDescription>
   <JobName>Downloads : The Official Microsoft ASP.NET Site</JobName>
   <JobOriginatingUserName>yaotian</JobOriginatingUserName>
   </JobDescription>
 - <JobProcessing>
   <Copies>1</Copies>
  - <JobFinishings>
   <Collate>false</Collate>
   <JogOffset>false</JogOffset>
   - <Staple>
   <Location>unknown</Location>
   <Angle>unknown</Angle>
   </Staple>
   - <HolePunch>
   <Edge>None</Edge>
   <Pattern>NotApplicable</Pattern>
   </HolePunch>
   </JobFinishings>
   <Priority>50</Priority>
   </JobProcessing>
 - <DocumentProcessing>
   <MediaSizeName>na_letter_8.5x11in</MediaSizeName>
   <MediaType>Auto</MediaType>
   <MediaColor>unknown</MediaColor>
   - <NumberUp>
   <PagesPerSheet>1</PagesPerSheet>
   <Direction>RightDown</Direction>
   </NumberUp>
   <Orientation>Portrait</Orientation>
   - <Resolution>
   <Width>600</Width>
   <Height>600</Height>
   </Resolution>
   <PrintQuality>Normal</PrintQuality>
   <Sides>OneSided</Sides>
   </DocumentProcessing>
   </PrintTicket>
```

FIG. 14

RESULTING PPD FILE

*OpenUI *Sides/Sides: PickOne
*FoomaticRIPOption Sides: enum WSJT '<PrintTicket
xmlns="http://schemas.microsoft.com/windows/2006/08/wdp/print">'
*OrderDependency: 10 AnySetup *Sides
*DefaultSides: OneSided
*Sides OneSided: "%% FoomaticRIPOptionSetting: Sides=OneSided"
*FoomaticRIPOptionSetting Sides=OneSided: "DocumentProcessing\Sides\OneSided"
*Sides TwoSidedLongEdge: "%% FoomaticRIPOptionSetting: Sides=TwoSidedLongEdge"
*FoomaticRIPOptionSetting Sides=TwoSidedLongEdge: "DocumentProcessing\Sides\TwoSidedLongEdge"
*Sides TwoSidedShortEdge: "%% FoomaticRIPOptionSetting: Sides=TwoSidedShortEdge"
*FoomaticRIPOptionSetting Sides=TwoSidedShortEdge: "DocumentProcessing\Sides\TwoSidedShortEdge"
*CloseUI: *Sides

FIG. 15

*OpenUI *ColorModel/Color Mode: PickOne
*FoomaticRIPOption ColorModel: enum CmdLine B
*OrderDependency: 10 AnySetup *ColorModel
*DefaultColorModel: Color
*ColorModel Color/Color: "%% FoomaticRIPOptionSetting: ColorModel=Color"
*FoomaticRIPOptionSetting ColorModel=Color: " -sDEVICE=pxlcolor"
*ColorModel Grayscale/Grayscale: "%% FoomaticRIPOptionSetting: ColorModel=Grayscale"
*FoomaticRIPOptionSetting ColorModel=Grayscale: " -sDEVICE=pxlmono"
*CloseUI: *ColorModel

*OpenUI *PageSize/PageSize: PickOne
*FoomaticRIPOption PageSize: enum CmdLine C
*OrderDependency: 20 AnySetup *PageSize
*DefaultPageSize: Letter
*PageSize A3/A3: "%% FoomaticRIPOptionSetting: PageSize=A3"
*FoomaticRIPOptionSetting PageSize=A3: " -sPAPERSIZE=a3"
*PageSize A4/A4: "%% FoomaticRIPOptionSetting: PageSize=A4"
*FoomaticRIPOptionSetting PageSize=A4: " -sPAPERSIZE=a4"
*PageSize Letter/Letter: "%% FoomaticRIPOptionSetting: PageSize=Letter"
*FoomaticRIPOptionSetting PageSize=Letter: " -sPAPERSIZE=letter"
*PageSize 11x17/11x17: "%% FoomaticRIPOptionSetting: PageSize=11x17"
*FoomaticRIPOptionSetting PageSize=11x17: " -sPAPERSIZE=11x17"
*CloseUI: *PageSize

FIG. 16A
Class Element
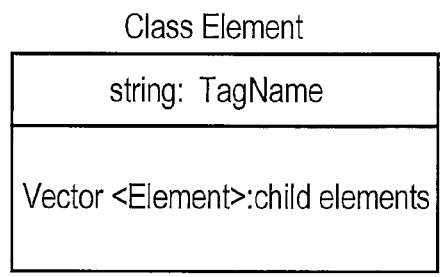
FIG. 16B
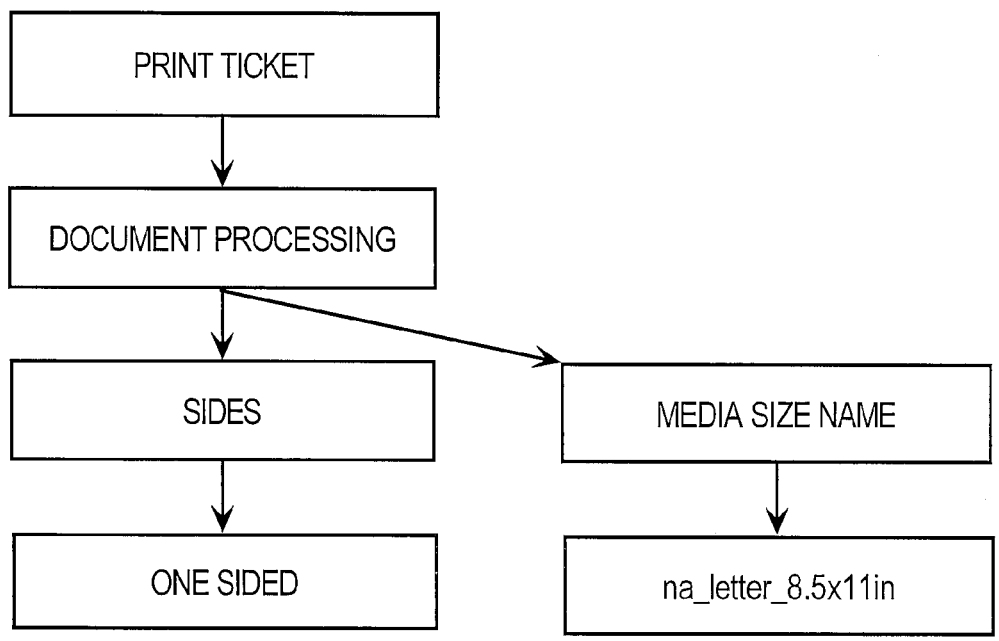
FIG. 16C
Hash Table
| Key | Value |
|---|---|
| string: TagName | Element |

DRIVERLESS ARCHITECTURE FOR PRINTING SYSTEMS

RELATED APPLICATION DATA

This application is related to U.S. patent application Ser. No. 12/399,891 entitled "Paper Size Support For A Print System", filed Mar. 6, 2009, U.S. patent application Ser. No. 12/399,884 entitled "Approach for Printing to Web Services-Enabled Printing Devices", filed Mar. 6, 2009, U.S. patent application Ser. No. 12/399,895 entitled "Print Driver Localization Support From Printing Device To Support Multiple User Profiles", filed Mar. 6, 2009, U.S. patent application Ser. No. 11/846,884 entitled "Capability-Based Control Of A Computer Peripheral Device", filed Aug. 29, 2007, U.S. patent application Ser. No. 11/846,926 entitled "Automatically Generating Capability-Based Computer Peripheral Device Drivers", filed Aug. 29, 2007, U.S. patent application Ser. No. 12/019,610 entitled "On-Demand Print Driver", filed Jan. 24, 2008, U.S. patent application Ser. No. 12/253,823 entitled "Providing Device Defined User Interface Modifiers To A Computer System", filed Oct. 17, 2008, and U.S. patent application Ser. No. 12/360,794 entitled "Automatically Updating A Printer Driver With New Printing Device Features", filed Jan. 27, 2009, the contents all of which are incorporated by reference in their entirety for all purposes as if fully set forth herein.

FIELD OF THE INVENTION

The present invention relates generally to printing systems and print drivers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

When a client device, such as a PC, prints to a printing device, such as a printer, a print subsystem on the client device processes print data generated by an application program on the client device, converts the print data into a format supported by the printing device, and sends the converted print data to the printing device, which then prints the print data. For example, a user creates an electronic document using a word processing application on a PC. The user then selects a print option in the word processing application to request that the electronic document be printed to a particular printer. The print subsystem on the PC processes this request by processing the print data for the electronic document, converting the print data into a format supported by the particular printer, and sends the converted print data to the particular printer. Generally, converted print data is sent to a printing device as part of a print job that is recognized by the printing device.

To perform these steps, which result in the printing device processing the submitted print job, the print subsystem on the client device usually makes use of a print driver, which includes processes that process print data generated by an application program and convert the print data into a format supported by the printing device. Conventionally, print drivers are specific to each printing device. That is, each print driver converts print data into a format supported by a particular printing device. Therefore, in order for a client device to print to a particular printing device, the client device must have installed on it the print driver for the particular printing device.

The steps that need to be performed in order to ensure that a client device has installed the appropriate print drivers—that is, the print drivers that correspond to the printing devices to which users of the client device wish to print to—may be tedious and onerous. For example, while print drivers are usually provided on storage media when a printing device is purchased, users do not have access to print drivers for printing devices not purchased by the users via storage media. Although print drivers may also be downloaded from the Internet, a user may not have access to the Internet when the user wishes to print to a particular printing device. Furthermore, if a printing device is updated with new capabilities or firmware, an older version of the print driver for the printing device may no longer be compatible with the updated printing device, necessitating the installation of a new print driver that is compatible with the updated printing device.

SUMMARY

Techniques are provided for allowing an application program to print to a new or updated printing device on a network without the user having to perform any updates or reconfigurations that are required with conventional print drivers. The techniques include techniques for retrieving new or updated printing device capabilities data from the printing device on the network, converting the retrieved printing device capabilities to a printer description file, generating print job tickets based on the printer description file, and submitting the print job tickets to the printing device as part of the submission of print jobs to the printing device.

According to one embodiment, a client device on which an application program is installed automatically retrieves new or updated printing device capabilities data from one or more printing devices on a network. Each set of retrieved printing device capabilities data is associated with a particular printing device. A set of printing device capabilities data is converted to a printer description file for the particular printing device, where the printer description file is in a format that is supported by the printing subsystem on the client device. The printing subsystem on the client device uses the printer description file to, among other things, generate a user interface for the application program that allows a user to view the capabilities of the printing device and to select desired settings for the printing device's capabilities. The printer description file also contains information used for generating a job ticket to the particular printing device. The job ticket for a particular print job is generated based on the printer description file and on the print settings selected by the user. The generated job ticket is submitted to the particular printing device as part of a print job.

BRIEF DESCRIPTION OF THE DRAWINGS

The present invention is illustrated by way of example, and not by way of limitation, in the figures of the accompanying drawings and in which like reference numerals refer to similar elements and in which:

FIG. 9 is a flow diagram that depicts an overview of the process for a Web services print driver generation module generating a PPD file for a Web services-enabled printing device.

FIG. 10 is a flow diagram that depicts using Web services print driver generation module to generate a print driver after protocol information has been obtained using CUPS protocol discovery.

FIG. 11 depicts the contents of an example PPD file.

FIGS. 12A-12D depict example printing device capabilities data retrieved from a printing device.

FIG. 13 depicts the contents of an example default print ticket file.

FIG. 14 depicts an example resulting PPD file generated by a Web services print driver generation module.

FIG. 15 depicts example non-device control information that controls how PDL is generated.

FIG. 16A depicts the Class Element and its two constituent fields that include a TagName and an array of child elements.

FIG. 16B depicts an example hierarchical representation of print ticket tags.

FIG. 16C depicts an example hash table that includes key/value pairs, where the key is the tag name and the value is the element.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. OVERVIEW
II. PRINTING SYSTEM ARCHITECTURE
III. "DRIVERLESS" PRINTING SYSTEM ARCHITECTURE
IV. "DRIVERLESS" PRINTING OVERVIEW
V. WEB SERVICES PRINT DRIVER GENERATION MODULE
VI. GENERATING A PPD FILE
VII. GENERATING AND SUBMITTING A PRINT JOB TICKET
VIII. EMBEDDING PRINT JOB TICKETS IN PRINT DATA
IX. IMPLEMENTATION MECHANISMS

I. Overview

Techniques are provided for allowing an application program to print to a new or updated printing device on a network without the user having to perform any updates or reconfigurations that are required with conventional print drivers. The techniques include techniques for retrieving new or updated printing device capabilities data from the printing device on the network, converting the retrieved printing device capabilities to a printer description file, generating print job tickets based on the printer description file, and submitting the print job tickets to the printing device as part of the submission of print jobs to the printing device.

II. Printing System Architecture

Figure 1:
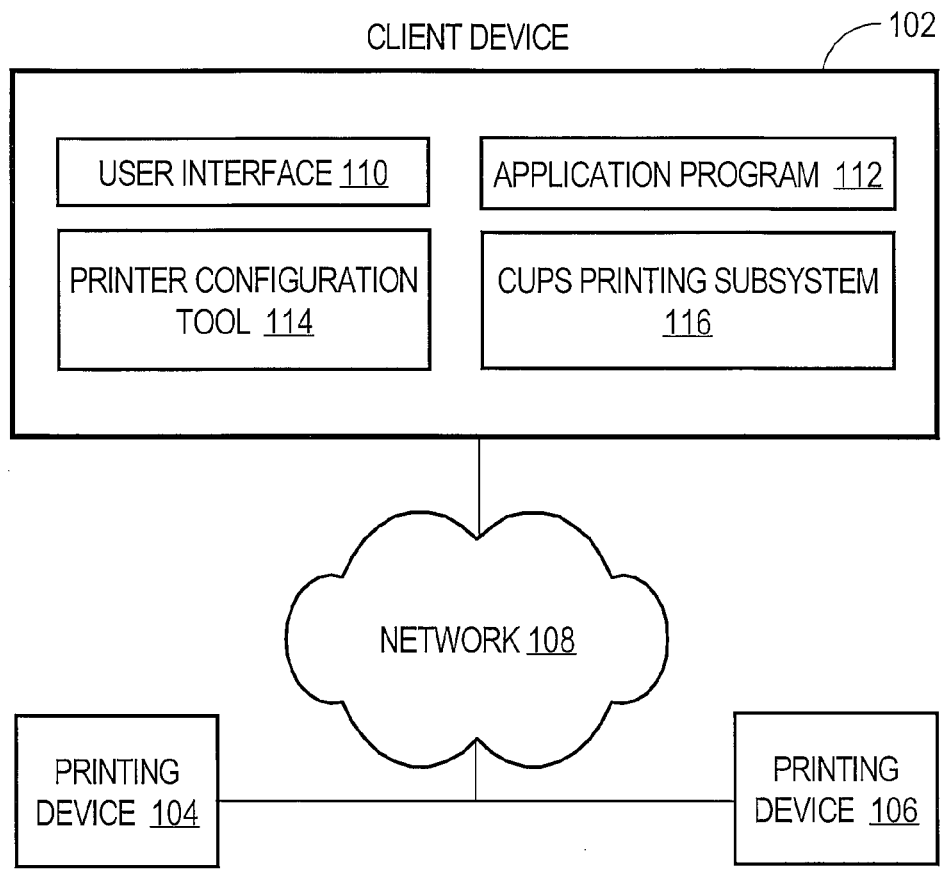
FIG. 1 is a block diagram that depicts an example printing arrangement that includes a client device and printing devices communicatively coupled via a network.

FIG. 1 is a block diagram that depicts an example printing arrangement 100 that includes a client device 102 and printing devices 104, 106 communicatively coupled via a network 108. Client device 102 includes a user interface 110, an application program 112, a printer configuration tool 114 and a Common UNIX Printing System (CUPS) printing subsystem 116. Client device 102 may include other elements that are not depicted in FIG. 1 or described herein for purposes of explanation.

User interface 110 is a mechanism and/or medium for presenting information to a user and allowing user input. Application program 112 may be any type of program that prints data. Examples of application program 112 include, without limitation, a word processing program, a spreadsheet program, an email client, etc. A single application program 112 is depicted in FIG. 1 for purposes of explanation, but client device 102 may have any number of application programs.

Printer configuration tool 114 may be implemented by one or more printer configuration modules and/or processes that interact with CUPS printing subsystem 116 and provide a graphical user interface for printer management. Printer configuration tool 114 is described in more detail hereinafter.

Figure 2:
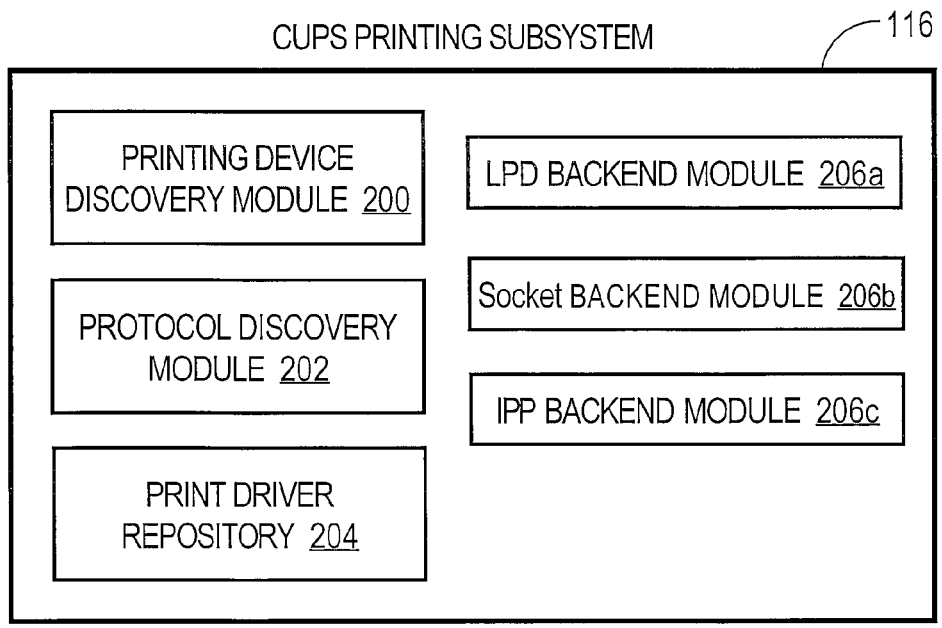
FIG. 2 is a block diagram that depicts example elements of a CUPS printing subsystem.

CUPS printing subsystem 116 provides printing support for client device 102. FIG. 2 is a block diagram that depicts example elements of CUPS printing subsystem 116. In this example, CUPS printing subsystem 116 includes a printing device discovery module 200, a protocol discovery module 202, a print driver repository 204 and one or more backend modules for one or more protocols, which in FIG. 2 include an LPD backend module 206a, a Socket backend module 206b and an IPP backend module 206c.

Figure 3:
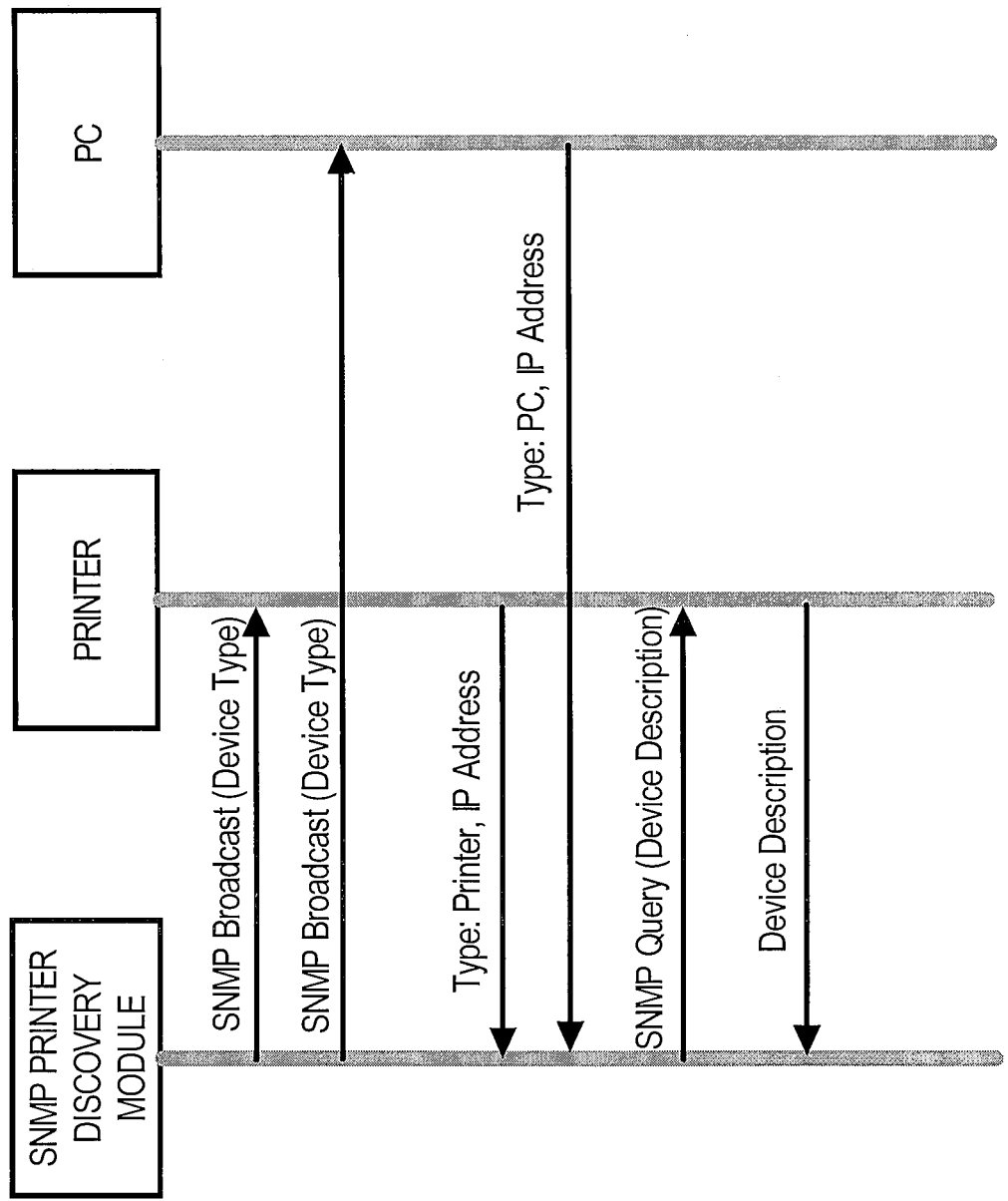
FIG. 3 is a flow diagram that depicts the use of an SNMP printer discovery module to discover available printing devices.

The printing device discovery module 200 discovers printing devices available over network 108. Any type and number of discovery mechanism(s) and/or process(es) may be used, depending upon a particular implementation. Printing device discovery module 200 may be configured with multiple types of discovery mechanisms. FIG. 3 is a flow diagram that depicts the use of an SNMP printer discovery module to discover available printing devices. In FIG. 3, the SNMP printer discovery module transmits a broadcast message over a network. The broadcast message requests that available network devices return their device type and IP address. In this example, both the printer and the personal computer (PC) return to the SNMP printer discovery module data that indicates their device type and IP address. The SNMP printer discovery module is interested only in printing devices and therefore transmits an SNMP Query to the printer requesting device description data, which the printer supplies to the SNMP printer discovery module. The information that the SNMP printer discovery module retrieves from network devices, such as device type, IP address and device description may be stored on client device 102 and also provided to printer configuration tool 114. Printer configuration tool 114 may display this information to a user via user interface 110.

The protocol discovery module 202 discovers the protocols supported by discovered network devices. In general, this involves protocol discovery module 202 attempting to communicate with a printing device using a particular protocol. If communications are established, then the printing device supports the particular protocol. If communications are not established, then the printing device does not support the particular protocol. This may be repeated for any number of protocols, depending upon a particular implementation.

Figure 4:
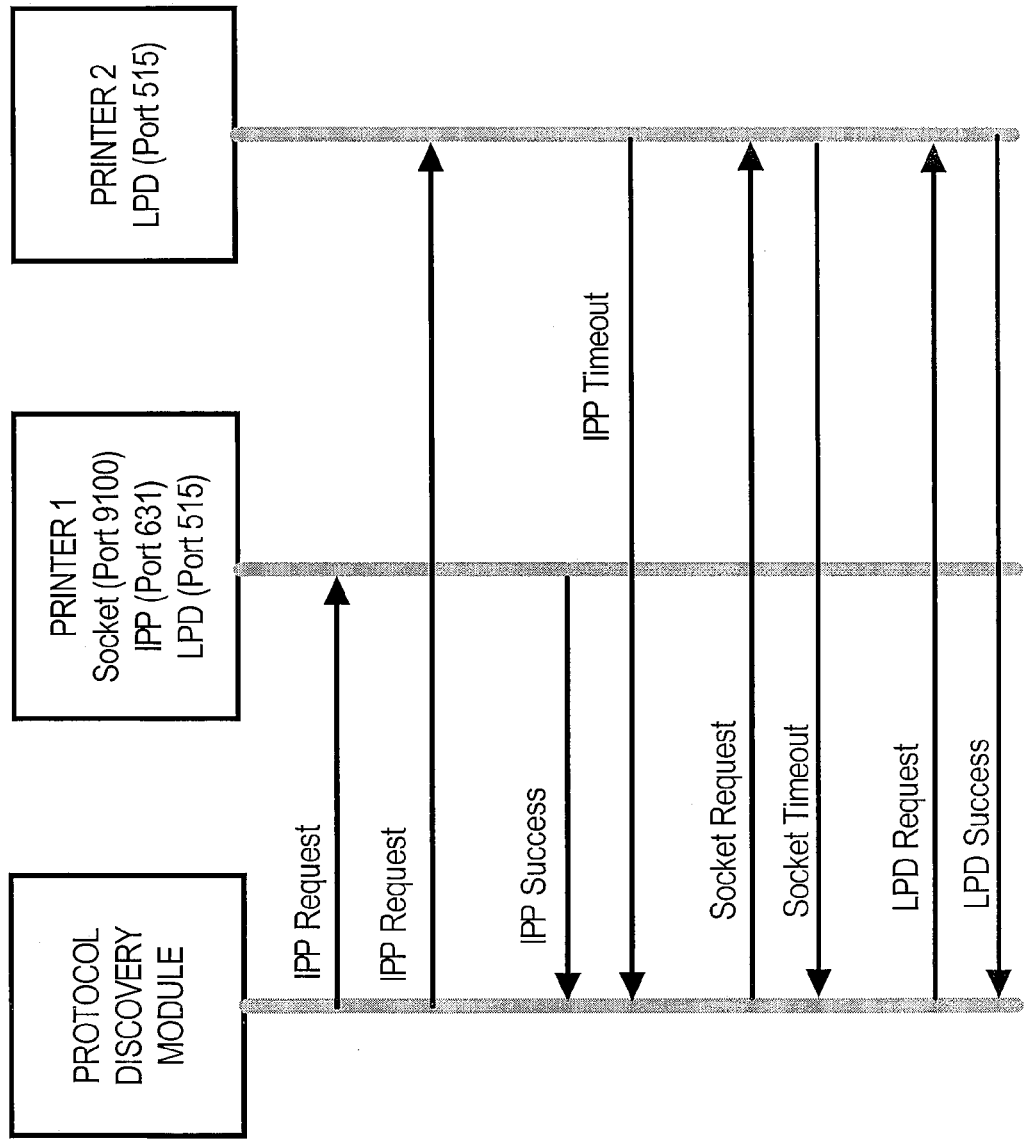
FIG. 4 is a flow diagram that depicts an approach for discovering protocols.

FIG. 4 is a flow diagram that depicts an approach for discovering protocols. In FIG. 3, two printers have previously been discovered and are identified in FIG. 4 as Printer 1 and Printer 2. Printer 1 supports the Socket protocol on Port 9100, the IPP protocol on Port 631 and the LPD protocol on Port 515. Printer 2 supports the LPD protocol on Port 515. In FIG. 4, the protocol discovery module, which may be protocol discovery module 202, first sends an IPP request to both Printer 1 and Printer 2. In the present example, protocol discovery module 202 receives a response from Printer 1, indicating that Printer 1 supports the IPP protocol. Protocol discovery module 202 does not receive a response from Printer 2 within a specified timeout period, indicating that Printer 2 does not support the IPP protocol. Protocol discovery module 202 sends a Socket request to Printer 2 and again does not receive a response from Printer 2 within a specified timeout period, indicating that Printer 2 does not support the Socket protocol. Protocol discovery module 202 sends an LPD request to Printer 2 and receives a response from Printer 2, indicating that Printer 2 supports the LPD protocol. This process may be repeated for any number of protocols. Also, in the present example depicted in FIG. 4, protocol discovery module 202 ceases protocol discovery of Printer 1 once it is determined that Printer 1 supports the IPP protocol, but protocol discovery module 202 may continue to discover other protocols supported by Printer 1.

Figure 5:
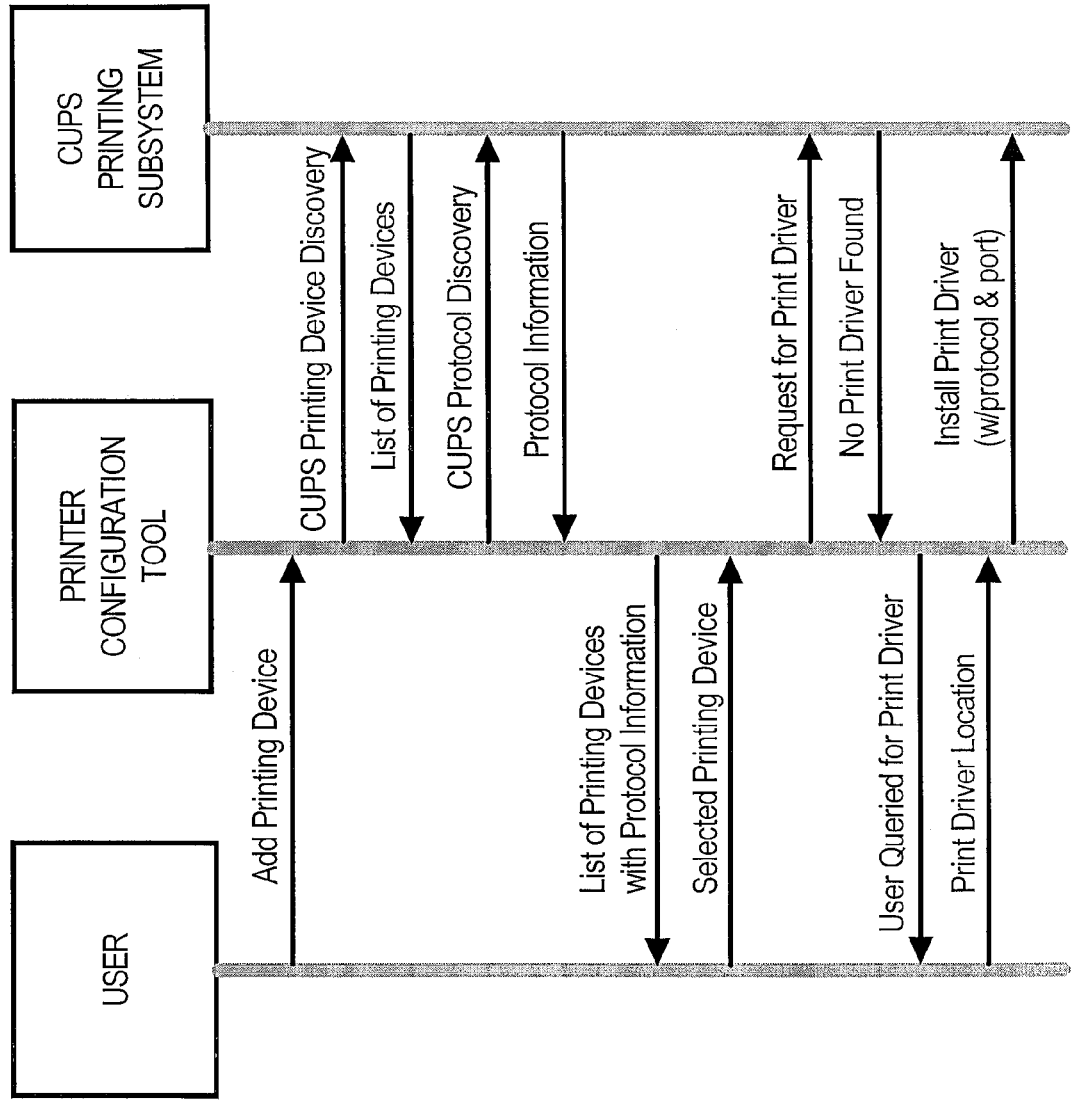
FIG. 5 is a flow diagram that depicts example functionality provided by a printer configuration tool.

FIG. 5 is a flow diagram that depicts example functionality provided by printer configuration tool 114. Printer configuration tool 114 generates a graphical user interface on user interface 110 that allows a user to manage printing devices. As depicted in FIG. 5, a user selects one or more graphical user interface objects associated with adding a print device, to client device 102, i.e., adding the capability to print to a new printing device from client device 102. In response to this selection, printer configuration tool 114 initiates CUPS printing device discovery on CUPS printing subsystem 116. This may include, for example, invoking printing device discovery module 200 to perform printing device discovery as previously discussed.

CUPS printing subsystem 116 provides a list of printing devices to printer configuration tool 114 and printer configuration tool 114 requests that CUPS printing subsystem perform CUPS protocol discovery to determine one or more protocols supported by the printing devices in the list of printing devices previously provided by CUPS printing subsystem 116. This may include, for example, invoking protocol discovery module 202 to perform protocol discovery as previously discussed. CUPS printing subsystem 116 provides protocol information to printer configuration tool 114. Printer configuration tool 114 provides the list of printing devices with the protocol information to the user via user interface 110. The user selects a printing device for which support is to be added to client device 102 and printer configuration tool 114 sends a request for the corresponding print driver to CUPS printing subsystem 116. This may include, for example, searching local storage on client device 102, including CUPS printing subsystem 116, as well as other storage sources available to client device 102, such as a database management system. In the present example it is presumed that no print driver is found for the selected printing device and CUPS printing subsystem 116 sends a message to printer configuration tool 114 to indicate that no print driver was located.

Printer configuration tool 114 queries the user, e.g., via user interface 110, for a print driver for the selected printing device. The user supplies to printer configuration tool 114, e.g., via user interface 110, a location of a print driver for the selected printing device. Printer configuration tool 114 sends a request to CUPS printing subsystem 116 to install the print driver for the selected printing device so that client device 102 can print to the selected printing device.

III. "Driverless" Printing System Architecture

Figure 6:
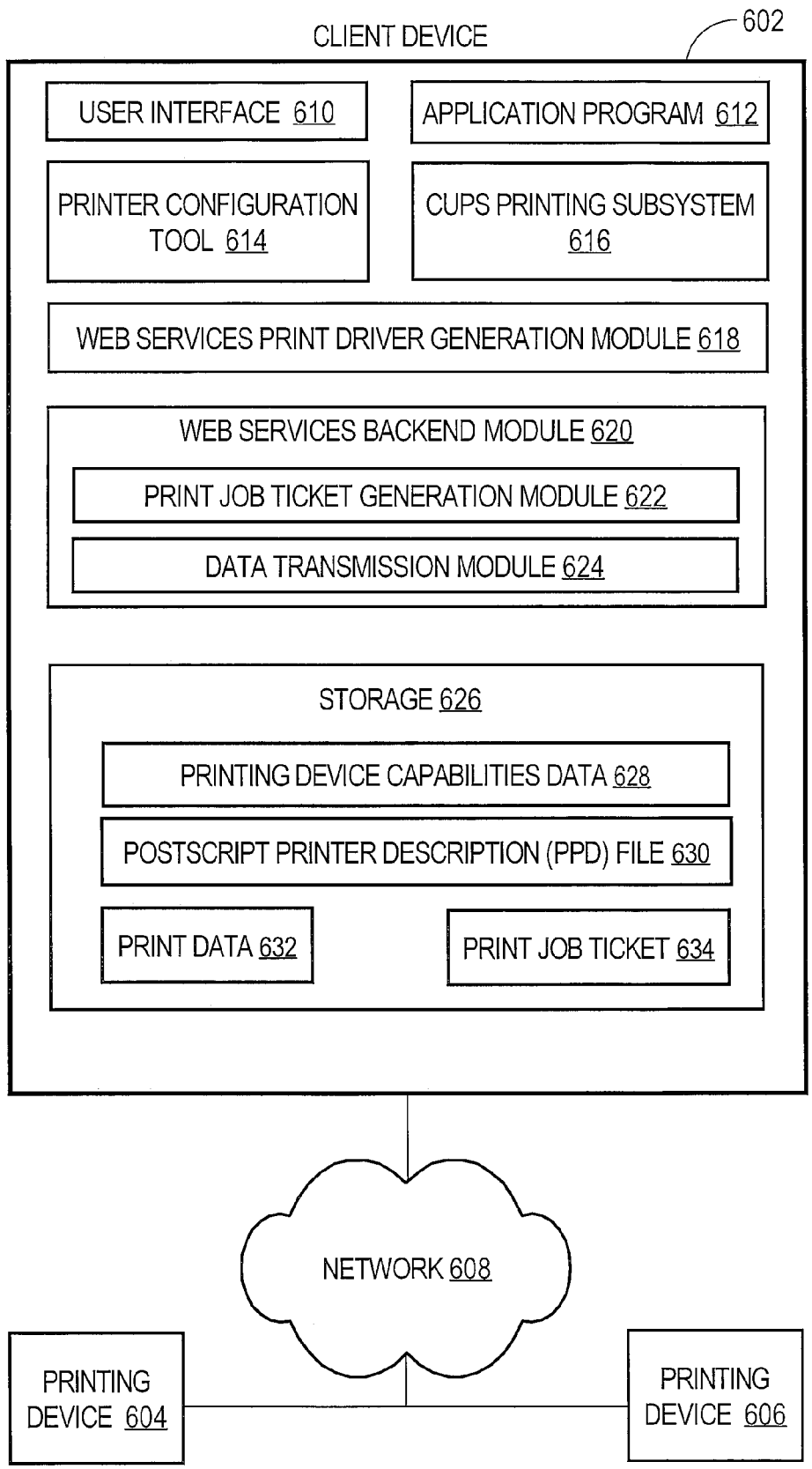
FIG. 6 is a block diagram that depicts an example arrangement in which a "driverless" printing system may be implemented.

FIG. 6 is a block diagram that depicts an example arrangement 600 in which a "driverless" printing system may be implemented, according to an embodiment of the invention. Arrangement 600 includes a client device 602 and printing devices 604, 606 that are communicatively coupled to each other via a network 608. Network 608 may be implemented by any medium or mechanism that provides for the exchange of data between the various elements depicted in FIG. 6. Examples of network 608 include, without limitation, a network such as a Local Area Network (LAN), Wide Area Network (WAN), Ethernet or the Internet, or one or more terrestrial, satellite or wireless links. Network 608 may also provide secure communications between the various elements depicted in FIG. 6. The various elements depicted in FIG. 6 may also communicate with each other via one or more direct communications links that are not depicted in FIG. 6 or described herein for purposes of brevity.

Client device 602 may be any type of client device and the invention is not limited to any particular type of client device. Examples of client device 602 include, without limitation, a desktop computer, a laptop computer, a personal digital assistant (PDA), a mobile device and a telephony device. In the present example, client device 602 includes a user interface 610, an application program 612, a printer configuration tool 614, a CUPS printing subsystem 616, a Web services print driver generation module 618 and a Web services backend module 620 that includes a print job ticket generation module 622 and a data transmission module 624. Client device 602 also includes storage 626 that includes printing device capabilities data 628, a postscript printer description (PPD) file 630, print data 632 and a print job ticket 634.

Printing devices 604, 606 may be any type of device that is capable of processing print data and generating a printed version of an electronic document reflected in the print data. Examples of printing devices 604, 606 include, without limitation, printers, network-enabled copy machines and multi-function peripherals (MFPs), and the approaches described herein are not limited to any particular type of printing devices 604, 606. Embodiments of the invention are described herein in the context of two printing devices depicted in FIG. 6, but the approach is applicable to any number of printing devices disposed in the same or different physical locations. Client device 602 may provide print data to printing devices 604, 606 in any format and according to any communications protocol, depending upon a particular implementation.

User interface 610 may be implemented by any mechanism(s) and/or process(es) that allow for the exchange of information between client device 602 and users. Examples of user interface 610 include, without limitation, a display, such as a cathode ray tube (CRT) or liquid crystal display (LCD), and an input device, such as a keypad, touchpad, touch screen, keyboard or mouse, or any combination of displays and input devices.

Application program 612 may be any type of application program that is capable of generating print data. Examples of application program 612 include, without limitation, a word processing program, a spreadsheet program, an email program or any other type of application. Although a single application program 612 is depicted in FIG. 6 for purposes of explanation, the approaches described herein are applicable to any number of application programs.

Web services print driver generation module 618 and print job ticket generation module 622 may be implemented in computer software, computer hardware, or any combination of computer hardware and software. For example, Web services print driver generation module 618 may be implemented as one or more software processes executing on client device 602. As another example, print job ticket generation module 622 may be implemented as executable code installed on client device 602.

Web services print driver generation module 618 is configured to retrieve printing device capabilities data from printing devices 604, 606. In retrieving printing device capabilities data, Web services print driver generation module 618 may communicate with printing devices 604, 606 through network 608. Each of printing devices 604, 606 may contain printing device capabilities data that is different from the printing device capabilities data contained on the other printing devices. Web services print driver generation module 618 is capable of retrieving the printing device capabilities data contained in any and all of the printing devices 604, 606. Web services print driver generation module 618 may include any number of sub-modules and processes for implementing the functionality described herein. As one example, Web services print driver generation module 618 may include a printing device capabilities retrieval module for retrieving printing device capabilities data from one or more printing devices.

Web services print driver generation module 618 generates printer description files, including, for example, PPD file 630, based on printing device capabilities data 628 retrieved from a printing device. A printer description file, including a PPD file, may be generated by the Web services print driver generation module 618 for each printing device of printing devices 604, 606.

Print job ticket generation module 622 generates print job tickets based on PPD files generated by the Web services print driver generation module 618 and user input received through user interface 610. A print job ticket may be generated by the print job ticket generation module 622 for a print job that is to be submitted to a particular printing device, such as printing device 604, 606.

Storage 626 may be implemented in any type of storage. Examples of storage 626 include, without limitation, volatile memory, such as random access memory (RAM) and non-volatile memory, such as one or more disks or flash memory. In an example embodiment, storage 626 contains printing device capabilities data 628, a PPD file 630, print data 632, and a print job ticket 634. Printing device capabilities data 628 is printing device capabilities data retrieved from printing devices 604, 606 by Web services print driver generation module 618. PPD file 630 is a printer description file generated by Web services print driver generation module 618. Print data 632 may be print data generated by application program 612. Print job ticket 634 is a print job ticket generated by print job ticket generation module 622.

IV. "Driverless" Printing Overview

Figure 7:
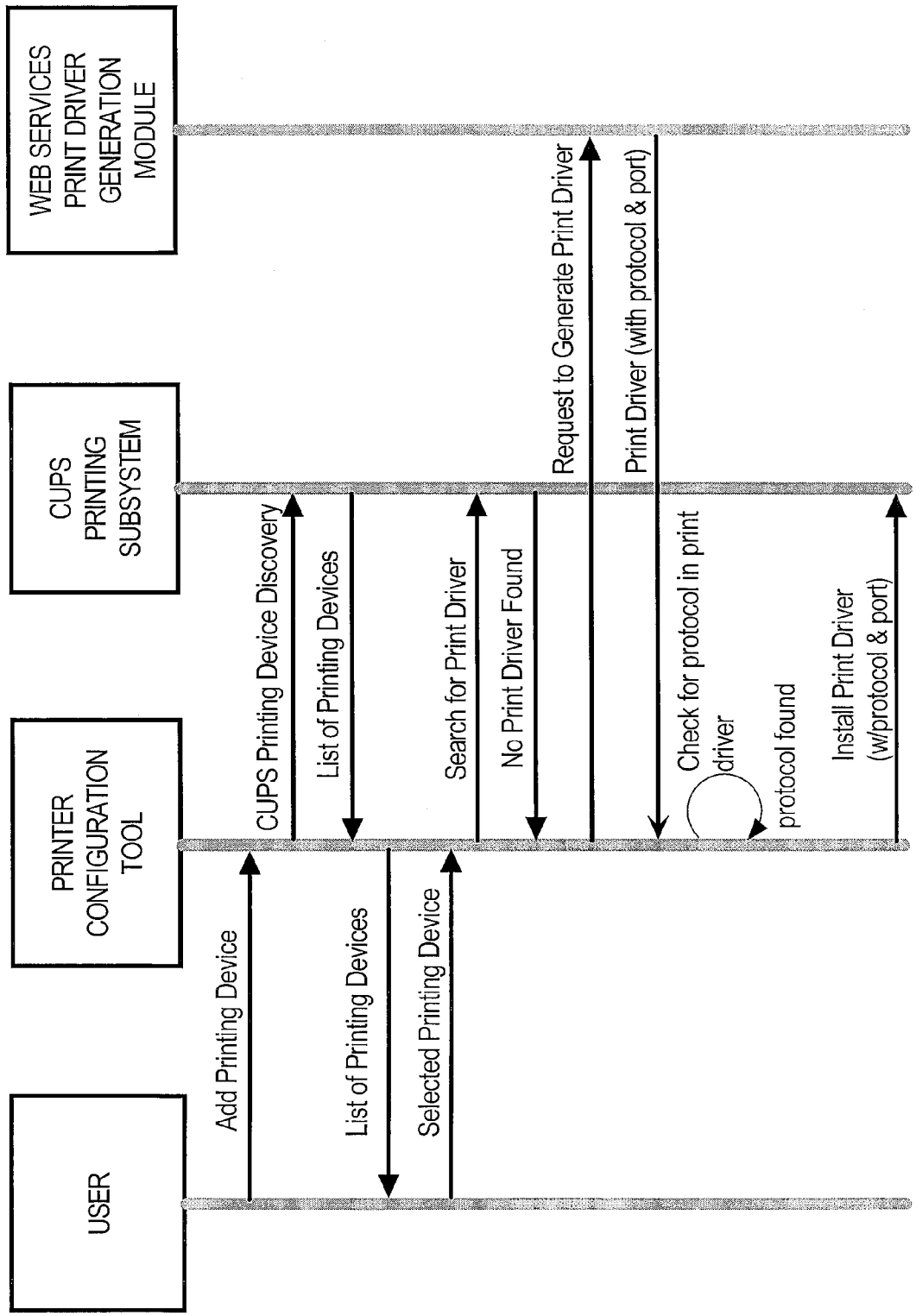
FIG. 7 is a flow diagram that depicts "driverless" printing.

FIG. 7 is a flow diagram that depicts "driverless" printing according to one embodiment of the invention. In particular, FIG. 7 depicts how Web services print driver generation module 618 interacts with other elements of client device 602, including the printer configuration tool 614 and the CUPS printing subsystem 616.

Printer configuration tool 614 generates a graphical user interface on user interface 610 that allows a user to manage printing devices. A user selects one or more graphical user interface objects associated with adding a print device, to client device 602, i.e., adding the capability to print to a new printing device from client device 602. In response to this selection, printer configuration tool 614 initiates CUPS printing device discovery on CUPS printing subsystem 616. This may include, for example, invoking printing device discovery module to perform printing device discovery as previously discussed.

CUPS printing subsystem 616 provides a list of printing devices to printer configuration tool 614. At this point, printer configuration tool 614 does not request that CUPS printing subsystem perform CUPS protocol discovery to determine one or more protocols supported by the printing devices in the list of printing devices provided by CUPS printing subsystem 616, as previously described herein with respect to FIG. 5.

Printer configuration tool 614 provides the list of printing devices to the user via user interface 610. The user selects a printing device for which support is to be added to client device 602 and printer configuration tool 614 sends a request for the corresponding print driver to CUPS printing subsystem 616. This may include, for example, searching local storage on client device 602, including CUPS printing subsystem 616, as well as other storage sources 626 available to client device 602, such as a database management system. In the present example it is presumed that no print driver is found for the selected printing device and CUPS printing subsystem 616 sends a message to printer configuration tool 614 to indicate that no print driver was located.

Printer configuration tool 614 requests that Web services print driver generation module 618 generate a print driver for the selected printing device. Web services print driver generation module 618 generates a print driver for the selected printing device as described in more detail hereinafter and provides the print driver, with protocol and port information, to printer configuration tool 614. Printer configuration tool 614 checks whether the print driver supplied by Web services print driver generation module 618 includes protocol and port information. If not, then printer configuration tool 614 may request that CUPS printing subsystem 616 provide the protocol and port information. Once the protocol and port information are available, printer configuration tool 614 requests that CUPS printing subsystem 616 install the print driver.

Figure 8:
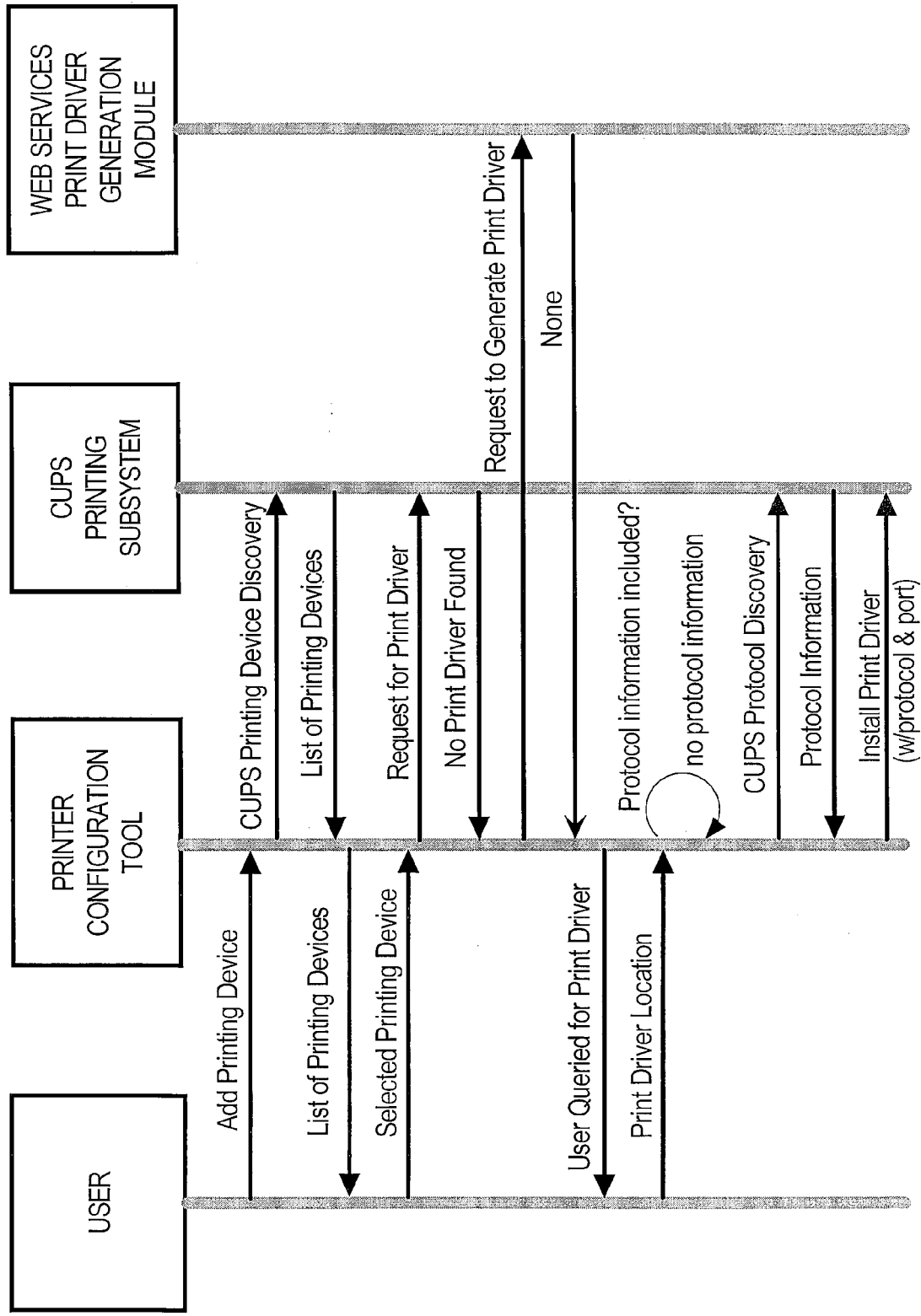
FIG. 8 depicts example interaction between a Web services print driver generation module and other elements of a client device.

FIG. 8 depicts example interaction between Web services print driver generation module 618 and other elements of client device 602, including the printer configuration tool 614 and the CUPS printing subsystem 616, when Web services print driver generation module 618 cannot generate a print driver.

Printer configuration tool 614 generates a graphical user interface on user interface 610 that allows a user to manage printing devices. A user selects one or more graphical user interface objects associated with adding a print device, to client device 602, i.e., adding the capability to print to a new printing device from client device 602. In response to this selection, printer configuration tool 614 initiates a CUPS printing device discovery on CUPS printing subsystem 616.

This may include, for example, invoking a printing device discovery module to perform printing device discovery as previously discussed.

CUPS printing subsystem 616 provides a list of printing devices to printer configuration tool 614. At this point, printer configuration tool 614 does not request that CUPS printing subsystem perform CUPS protocol discovery to determine one or more protocols supported by the printing devices in the list of printing devices provided by CUPS printing subsystem 616, as previously described herein with respect to FIG. 5.

Printer configuration tool 614 provides the list of printing devices to the user via user interface 610. The user selects a printing device for which support is to be added to client device 602 and printer configuration tool 614 sends a request for the corresponding print driver to CUPS printing subsystem 616. This may include, for example, searching local storage on client device 602, including CUPS printing subsystem 616, as well as other storage sources available to client device 602, such as a database management system. In the present example it is presumed that no print driver is found for the selected printing device and CUPS printing subsystem 616 sends a message to printer configuration tool 614 to indicate that no print driver was located.

Printer configuration tool 614 requests that Web services print driver generation module 618 generate a print driver for the selected printing device. In this example, Web services print driver generation module 618 is unable to generate a print driver for the selected printing device and does not return a print driver to printer configuration tool 614. Printer configuration tool 614 queries the user, e.g., via user interface 610, for a print driver for the selected printing device. The user supplies to printer configuration tool 614, e.g., via user interface 610, a location of a print driver for the selected printing device. Printer configuration tool 614 determines whether the print driver at the user-specified location includes protocol information. If not, then printer configuration tool 614 sends a request to CUPS printing subsystem 616 to discover the protocol information for the selected printing device and CUPS printing subsystem 616 provides the protocol information to printer configuration tool 614. Printer configuration tool 614 installs the print driver with protocol and port information, if applicable, for the selected printing device so that client device 602 can print to the selected printing device.

V. Web Services Print Driver Generation Module

FIG. 9 is a flow diagram that depicts an overview of the process for Web services print driver generation module 618 generating PPD file 630 for a Web services-enabled printing device, according to one embodiment of the invention. Web services print driver generation module 618 first retrieves printing device capabilities data from one or more printing devices. The particular manner in which this is accomplished may vary, depending upon a particular implementation. The printing device capabilities data for a printing device is stored on the printing device and contains information about the capabilities of the printing device. For example, the printing device capabilities data for a particular printing device may indicate that the particular printing device is capable of duplex printing (printing on both sides of a paper), and that the options for using the duplex printing capability are one-sided, two-sided short-edge, and two-sided long-edge. Continuing with this example, a print job may be submitted to the particular printing device where the print job indicates that the option of two-sided short-edge should be used for the duplex printing capability when the particular printing device processes the print job.

When a printing device is updated with a new capability, the printing device capabilities data for the printing device may also be updated. For example, a printing device may be updated with a staple finisher. In this example, the printing device capabilities data on the printing device may also be updated with a new capability (e.g., "staple") and options for using the new capability (e.g., "corner" and "side"). After this update, the next time the printing device capabilities retrieval module on a client device communicates with the printing device to retrieve printing device capabilities data from the printing device, the updated printing device capabilities data will be retrieved.

Returning to FIG. 9, Web services print driver generation module 618 generates and transmits a Web Service probe message to the Web Services-enabled printing device at the Web Services-enabled printing device's IP address. According to one embodiment, the Web Service probe message is sent to the "discovery port" of the Web Services-enabled printing device. A Web Service device is configured to listen to the discovery port for any probe messages. The discovery port number is typically 3702, but may be any other number of a port that is designated as the discovery port of a Web Service device.

When the Web Service-enabled printing device receives the Web Service probe message, the Web Service-enabled printing device responds by sending, back to the Web services print driver generation module 618, a probe response message that contains a Web Service port number. The Web Service-enabled printing device is configured to listen to the port with the Web Service port number for Web Service requests. For example, a common port number used as the Web Service port number by Web Service devices is 53000.

Web services print driver generation module 618 then requests print capabilities data from the Web services printing device by sending a request to the port on the Web Service-enabled printing device with the Web Service port number. The Web services printing device provides the requested print capabilities data to Web services print driver generation module 618. According to one embodiment of the invention, the printing device capabilities data includes a printer default print job ticket and a printer configuration file. The printing device capabilities data may then be stored on client device 602 as printing device capabilities data 628. In one embodiment, the printing device capabilities data retrieved from a printing device is contained in an XML file.

Web services print driver generation module 618 may retrieve printing device capabilities data from a particular printing device when the particular printing device becomes available for printing for the first time, when Web services print driver generation module 618 is notified by the particular printing device that updated printing device capabilities data is available, or on a periodic basis (e.g., once a week). Users of client device 602 may also request that the latest printing device capabilities data be retrieved from a particular printing device. Web services print driver generation module 618 then generates/updates a PPD file 630 based upon the printing device capabilities data received from the Web services printing device.

As depicted in FIG. 9, the non-Web services printing device does not recognize the Web services probe message. In this situation, Web services print driver generation module 618 does not receive a response from the non-Web service printing device and eventually a timeout associated with the sending of the Web services probe message occurs. In other embodiments, steps different from those depicted in FIG. 9 may be used to retrieve printing device capabilities data from a printing device. For example, if the printing device is not a Web Service-enabled printing device, Web services print driver generation module 618 may employ a protocol other than the Web Service discovery protocol to initiate communications with the printing device and to request the printing device for printing device capabilities.

FIG. 10 is a flow diagram that depicts using Web services print driver generation module 618 to generate a print driver after protocol information has been obtained using CUPS protocol discovery. A user selects one or more graphical user interface objects associated with adding a print device, to client device 602, i.e., adding the capability to print to a new printing device from client device 602. In response to this selection, printer configuration tool 614 initiates CUPS printing device discovery on CUPS printing subsystem 616. This may include, for example, invoking printing device discovery module 200 to perform printing device discovery as previously discussed.

CUPS printing subsystem 616 provides a list of printing devices to printer configuration tool 614. Printer configuration tool 614 requests that CUPS printing subsystem perform CUPS protocol discovery to determine one or more protocols supported by the printing devices in the list of printing devices previously provided by CUPS printing subsystem 616. This may include, for example, invoking protocol discovery module 202 to perform protocol discovery as previously discussed. CUPS printing subsystem 616 provides protocol information to printer configuration tool 614.

Printer configuration tool 614 provides the list of printing devices with the protocol information to the user via user interface 610. The user selects a printing device for which support is to be added to client device 602 and printer configuration tool 614 sends a request for the corresponding print driver to CUPS printing subsystem 616. This may include, for example, searching local storage on client device 602, including CUPS printing subsystem 616, as well as other storage sources available to client device 602, such as a database management system. In the present example it is presumed that no print driver is found for the selected printing device and CUPS printing subsystem 616 sends a message to printer configuration tool 614 to indicate that no print driver was located.

Printer configuration tool 614 sends a request to Web services print driver generation module 618 to generate a print driver for the selected printing device. Web services print driver generation module 618 generates and provides a print driver to printer configuration tool 614. Note that in this example, printer configuration tool 614 has already obtained the protocol information via CUPS printing subsystem 616. Thus, it is irrelevant whether Web services print driver generation module 618 generates the protocol information for the selected printing device. As a final step, printer configuration tool 614 sends a request to CUPS printing subsystem 616 to install the print driver for the selected printing device so that client device 602 can print to the selected printing device.

VI. Generating a PPD File

A PPD file contains all the information that is needed for the generation of a print job ticket to be submitted to a printing device. FIG. 11 depicts the contents of an example PPD file. A print job ticket is a file that contains control information for a print job that is to be processed by a particular printer, and is submitted to the particular printer as part of the submission of the print job to the particular printing device. A single PPD file may be generated for each printing device, based on the printing device capabilities data for the each printing device. Once a PPD file is generated for a particular printing device, multiple print job tickets may be generated for the particular printing device based on the PPD file without regeneration of the PPD file.

The PPD file also contains information that may be used by other parts of the printing subsystem on a client device. For example, PPD file 630 may be read by a user interface generation module (not depicted) on client device 602 in generating user interface 610.

The Web services print driver generation module 618 generates and stores PPD file 630 such that PPD file 630 is capable of being used by other parts of the printing subsystem on client device 602 and by print job ticket generation module 622 for the generation of print job tickets (further details regarding the generation of print job tickets are discussed below). Accordingly, Web services print driver generation module 618 converts the printing device capabilities data 628 retrieved from a particular printing device into a format that is supported by other parts of the printing subsystem on client device 602. In addition, Web services print driver generation module 618 may append information to the printing device capabilities data 628 to facilitate the generation of print job tickets for the particular printing device. Specific examples of the generation of a portion of a PPD file are discussed in more detail hereinafter. However, these examples are not limiting and a PPD file may be generated in any manner consistent with the functionality of PPD files just discussed.

FIGS. 12A-12D depict example printing device capabilities data 628 retrieved from a printing device. In this example, the portion of printing device capabilities data 628 depicted in FIG. 12B includes the following data:

```
<wprt:DocumentProcessing>
  <wprt:Sides>
    <wprt:AllowedValue>OneSided</wprt:AllowedValue>
    <wprt:AllowedValue>TwoSidedLongEdge</wprt:AllowedValue>
    <wprt:AllowedValue>TwoSidedShortEdge</wprt:AllowedValue>
  </wprt:Sides>
```

This printing device capabilities data contains information about the duplex printing capability of the particular printing device. According to the above, this capability is named "Sides", and there are three options when using the "Sides" capability: print one-sided, print two-sided long-edge, and print two-sided short-edge. Accordingly, one of three values that represent the three options—"OneSided", "TwoSidedLongEdge", and "TwoSidedShortEdge"—may be selected for the "Sides" capability.

FIG. 13 depicts the contents of an example default print ticket file. This example default print ticket file contains data that specifies default printing values. For example, the default orientation, indicated by the Orientation tag, is portrait, and the type of printing, indicated by the Sides tag, is OneSided. Portions of the printing device capabilities data 628 and the default print ticket file are used to create the resulting PPD file 630. In order for the printing device capabilities data 628 to be read and used by other parts of the printing subsystem on client device 602, printing capabilities data 628 must first be converted to a format that is supported by the printing subsystem. On Windows-based operating systems, the format that is supported by the printing subsystem is the GPD (Generic Printer Description) or PPD file format. On UNIX-based operating systems, the supported format is the PPD (PostScript Printer Description) file format. In most cases, UNIX-based operating systems contain the CUPS Printing System, which supports the PPD file format. The Web services print driver generation module 618 may also convert printing device capabilities data 628 into formats other than GPD and PPD for use on client devices whose printing subsystem supports other formats. FIG. 14 depicts an example resulting PPD file 630 generated by Web services print driver generation module 618. Note that in this example, the resulting PPD file 630 includes user interface information as indicated by:

```
*OpenUI *Sides/Sides: PickOne
*FoomaticRIPOption Sides: enum WSJT '<PrintTicket
```

Where the "enum WSJT" is an extension, along with the next statement "xmlns="http://schemas.microsoft.com/windows/2006/08/wdp/print">". Note also that the "*DefaultSides: OneSided" statement originates in the default print ticket file depicted in FIG. 13, and the following portion:

```
*OpenUI *Sides/Sides: PickOne
*Sides OneSided:
"DocumentProcessing\Sides\OneSided"
*Sides TwoSidedLongEdge
"DocumentProcessing\Sides\TwoSidedLongEdge"
*Sides TwoSidedShortEdge
"DocumentProcessing\Sides\TwoSidedShortEdge"
*CloseUI: *Sides
``` originates in the printing device capabilities data 628 depicted in FIGS. 12A-12D. In the example above, the text "*OpenUI" and "*CloseUI" indicate that between these two texts is information regarding the generation of a portion of a user interface. In this case, the user interface portion generated would allow the user to pick one ("PickOne") of three allowed values for the capability "Sides": "OneSided", "TwoSidedShortEdge", and "TwoSidedLongEdge". As discussed above, these three allowed values represent the possible options for using the capability of two-sided printing. Referring to FIG. 6, in an example where client device 602 is a UNIX-based system whose print subsystem supports the PPD file format, Web services print driver generation module 618 generates PPD file 630 in the PPD file format that contains the above portion of a PPD file, where the generation of the PPD file 630 is based on printing device capabilities data 628, which contains the above portion of printing device capabilities data.

Note that in some situations, the non-device control information that controls how PDL is generated, e.g., ColorMode, MediaSize, is added by the module that generates the PPD, e.g., 618. FIG. 15 depicts example non-device control information that controls how PDL is generated.

Continuing with the example, the print subsystem on client device 602 may use the PPD file 630 to, among other things, generate user interface 610. In this example, information contained in the PPD file 630 allows a user interface 610 to be generated where the user interface 610 displays a print option that corresponds to the "Sides" capability and an interface that allows a user to select one of three values for the print option, where the three values correspond to "OneSided", "TwoSidedLongEdge", and "TwoSidedShortEdge".

In general, user interface 610 on client device 602 is generated based on PPD file 630, where PPD file 630 is converted from printing device capabilities data 628, which in turn contains information about a particular printing device's printing capabilities and which is retrieved from the particular printing device. User interface 610 may be generated in response to a user of client device 602 issuing a print command in application program 612. In the case where a particular printing device is updated with a new capability and new printing device capabilities data, client device 602 may retrieve, using Web services print driver generation module 618, the updated printing device capabilities data from the particular printing device, generate a PPD file for the particular printing device based on the retrieved updated printing device capabilities data, and generate a user interface based on the printer description file that includes the new capability on the particular printing device along with user-selectable values for the new capability, all without any installation or updating of printer drivers by any users of client device 602.

In addition, PPD file 630 also contains all the information that is needed for generating a print job ticket. For example, the generation of a print job ticket may require information about a tree structure of the print job ticket. A tree structure indicates a hierarchical structure that conforms to a print job ticket format for certain types of print job ticket. In the PPD file portion above, the "DocumentProcessing\Sides\OneSided" line is an example of information that indicates a tree structure, as it indicates a hierarchy of "DocumentProcessing" capabilities, the "Sides" capability, and the "OneSided" value.

Not all the information in a PPD file 630 is necessarily used by all the processes and modules on a client device 602 that read and use the PPD file 630. For example, the part of the print subsystem that generates user interface 610 may rely on only a portion of the PPD file 630, and ignore any additional information, such as information regarding a tree structure for a printing device's capabilities, which is used by the print job ticket generation module 622. In another example, a PPD file 630 for a Web Service-enabled printing device may contain the Web Service port number (e.g., "*cupsProtocol: ws (53000)") of the Web Service-enabled printing device, which may be ignored by both the module that generates user interface 610 and the print job ticket generation module 622, but which may be used by another process on client device 602 that submits print jobs to the Web Service-enabled printing device. Additional information, or "extensions", may be contained in the PPD file 630 that is not part of a traditional PPD file. These "extensions" may be ignored by processes that use and support only traditional PPD files, but may be used by other processes that use the additional information contained in the "extensions".

VII. Generating and Submitting a Print Job Ticket

Web services backend module 620 includes print job ticket generation module 622 that is configured to generate print job ticket 634 based on PPD file 630 and store the print job ticket 634. Web services backend module 620 also includes data transmission module 624 that is configured to transfer print job ticket 634 to a printing device using Web services protocol. Print job ticket 634 contains control information for a print job that is to be processed by a particular printer, and is submitted to the particular printer as part of the submission of the print job to the particular printing device. A print job ticket 634 is generated for a specific printing device and for a specific print job. Each print job that is submitted to a particular printer (e.g., printing a word processing document to the particular printer) includes a print job ticket 634 that is generated for the particular print job. The print job ticket does not contain control information specific to that particular printer (e.g., Postscript command to set double-sided pages " "<</Duplex true/Tumble false>>setpagedevice"), but only the job ticket setting (e.g., two-sided-short-edge)

A print job ticket 634 for a print job is generated based on the PPD file 630 for the particular printing device to which the print job is to be submitted and on the print settings for the print job. The print settings for the print job indicate which capability values are to be used when the particular printing device processes the print job. For example, the duplex printing capability may be used with one of three different values ("OneSided", "TwoSidedLongEdge", and "TwoSidedShortEdge"). A print job ticket 634 for a print job that is to be submitted to a particular printing device that has the duplex printing capability will therefore contain information regarding which one of the three different values is to be used for the print job.

According to one embodiment, the print settings for a print job are based on user input received through user interface 610. For example, if a user selects, through user interface 610, the value "OneSided" of the duplex printing capability ("Sides"), then this selection results in the print settings indicating that the value "OneSided" is to be used. In turn, the print job ticket generation module 622 locates the corresponding command in the PPD file 630 for this setting value and generates data for the print job ticket 634 that indicates that the value "OneSided" for the "Sides" capability is to be used. In the present example, print job ticket generation module 622 locates, in the resulting PPD file depicted in FIG. 14, the command "DocumentProcessing\Sides\OneSided" that corresponds to the value "OneSided" for the duplex printing capability. Print job ticket generation module 622 then generates a corresponding entry for the print job ticket 634. An example first print job ticket entry is:

```
<PrintTicket
xmlns="http://schemas.microsoft.com/windows/2006/08/wdp/print">
- <DocumentProcessing>
    <Sides>OneSided</Sides>
  </DocumentProcessing>
</PrintTicket>
```

This first entry for the print job ticket 634 indicates that for the "Sides" capability, the value "OneSided" is to be used. Note that the tree structure indicated by the tags in the above portion—"<DocumentProcessing>" and "</DocumentProcessing>" enclosing "<Sides> and </Sides>"—follow the tree structure indicated in the portion of the example PPD file discussed above.

If multiple options are selected, multiple print ticket entries are merged together. For example, suppose a second print ticket entry is generated:

```
- <PrintTicket
      xmlns="http://schemas.microsoft.com/windows/2006/08/wdp/print">
- <DocumentProcessing>
    <MediaSizeName>na_letter_8.5x11in</MediaSizeName>
  </DocumentProcessing>
</PrintTicket>
```

In this situation, Web services backend module 620 merges the two print ticket entries into a single entry as follows:

```
- <PrintTicket
      xmlns="http://schemas.microsoft.com/windows/2006/08/wdp/print">
- <DocumentProcessing>
    <Sides>OneSided</Sides>
    <MediaSizeName>na_letter_8.5x11in</MediaSizeName>
  </DocumentProcessing>
</PrintTicket>
```

According to one embodiment of the invention, print ticket tags are represented as members of a class Element. FIG. 16A depicts the Class Element and its two constituent fields that include a TagName and an array of child elements. FIG. 16B depicts an example hierarchical representation of print ticket tags. In this example, the tag Print Ticket has one child element Document Processing. Document Processing has two child elements including Sides and Media Size Name that each has one child element. Print ticket tag Sides has the child element One Sided and Media Size Name has the child element na_letter_8.5x11 in. According to one embodiment of the invention, Web services backend module 620 maintains a hash table for all existing elements, to enable fast determinations of whether an element already exists to avoid duplication. FIG. 16C depicts an example hash table that includes key/value pairs, where the key is the tag name and the value is the element. Thus, when processing the first print ticket entry above, the objects PrintTicket, DocumentProcessing, Sides and OneSided are created. The object PrintTicket is assigned to a PrintTicketRoot object in the data structure generated by Web services backend module 620. Entries for PrintTicket, DocumentProcessing, Sides and OneSided are also created and inserted into a hash table in the data structure generated by Web services backend module 620. When processing the second print ticket entry above, the element DocumentProcessing already exists in the hash table, so it does not need to be recreated. The element MediaSizeName is not found in the hash table, so it is created as an instance of the Element class and added as a child element of DocumentProcessing. MediaSizeName is also added to the hash table. Similarly, the element na_letter_8.5x11 in is created as an instance of Element class, added as child element of MediaSizeName and inserted into the hash table. When every print ticket entry has been processed and added to the data structure, Web services backend module 620 performs a recursive "prettyprint" function and processes all of the elements, starting from printticketroot and processing all the child elements to generate a final print ticket.

In one embodiment, print job ticket generation module 622 also generates print job ticket 634 based on a set of default print settings, which are used if and when a user does not select a value for a capability through user interface 610. For example, a print job is to be sent to a particular printing device, where the particular printing device has a capability of printing in color and where one of two values ("BW" and "color") may be selected for the color printing capability. Accordingly, a user interface 610 is generated that allows a user to select a value for the color capability. The user, however, does not select either "BW" or "color". In this example, print job ticket generation module 622 will generate a print job ticket 634 that indicates that the value for the color capability is the default print setting for that capability. If the default printing setting for the color capability is "BW" (black-and-white), then the print job ticket generation module 622 will generate a print job ticket 634 that directs the particular printing device to print in black-and-white.

According to one embodiment, a set of default print settings are indicated in a default print job ticket that indicates a default value for the capabilities of a particular printing device. Each printing device may be associated with its own default print job ticket, and default print job tickets may be retrieved in the same manner as, or along with, printing device capabilities data 628 from printing devices, described above.

In one embodiment, user selected print settings received through user interface 610 are stored as part of print data generated by an application program. In this embodiment, print job ticket generation module 622 generates print job ticket 634 based on both PPD file 630 and application print data. In an alternative embodiment, user selected print settings may be stored as a separate file on client device 602, and the print job ticket generation module 622 may generate print job ticket 634 based on the stored print settings file.

The submission of a print job to a particular printing device includes the submission of the print job ticket 634 for the print job and the submission of print data 632 for the print job. The generation of a print job ticket 634 has just been described in detail. Print data 632 is in a format recognized by the particular printing device, and is converted from application print data generated by an application program 612. For example, a pdf viewer application generates application print data in the form of a PDF file. This application print data is converted into a format recognized by the particular printing device to which the print job is to be submitted and stored as print data 632. Later, print data 632 is submitted as part of the print job.

Alternatively, the application print data in the form of a PDF file may be further processed by one or more other application data processing modules, which then generates another set of application print data. For example, an application data processing module may process the PDF file and generates a PS (Postscript) file. The PS (Postscript) file may also be converted into a format recognized by the particular printing device to which the print job is to be submitted and stored as print data 632 that will be later submitted as part of the print job.

In one embodiment, the conversion of data generated by an application or an application data processing module into a format supported by the printing device that is to process a print job is performed by CUPS printing subsystem 616.

In the submission of a print job to a particular printing device, the print job ticket 634 of the print job may be submitted to the printing device separately from the print data 632 of the print job. For Web Service-enabled printing devices, the print job ticket 634 and print data 632 are submitted as separate files and according to the Web Service submission protocol.

VIII. Embedding Print Job Tickets in Print Data

According to one embodiment of the invention, print job ticket 634 is embedded with print data 632 and sent to a printing device as a single file. According to this approach, the data that is common to existing protocols, e.g., Socket, IPP, LPD, etc., is provided in a conventional manner. In this scenario, web services backend module 620 will not have or use the data transmission module 624, instead, the data transmission task will be performed by CUPS printing subsystem 616. The print job settings data, e.g., DocumentProcessing\Sides\OneSided, etc. is embedded in the print job data, e.g., as PJL or part of the PDL commands. One example format for embedding a print job ticket into PDL is as follows:

<0x1b>%-12345X@PJL<SP>COMMENT<SP>PRINT-TICKET:2000<SP>"<2000 bytes, must not contain <LF>>"[<CR>]<LF>

The print job ticket 634 may be the same format as a WS print ticket. Printing devices support the embedded print ticket format regardless of the protocol used to receive print jobs, i.e., socket:9100, lpd:515, ipp:631, ws:53000, etc. According to one embodiment of the invention, Web services backend module 620 is the last file conversion filter to process the print data 632. With this approach, the print ticket is embedded in the print data by Web services backend module 620 and printer configuration tool 614 can use any protocol when installing the print driver. When submitting the print job, the print job is processed by Web services backend module 620, which generates the print job ticket and embeds the print job ticket within the PDL. A printing backend module provided by CUPS printing subsystem 616 (socket, lpd, ipp, etc) submits the PDL (with embedded print job ticket 634) to the printing device. The printing device reads the embedded print job ticket 634 from print data 632 and process print data 632 with job settings contained in the print job ticket 634. With this approach, a conventional backend module may be used, e.g., a backend module for Socket, IPP, LPD, etc.

Figure 17:
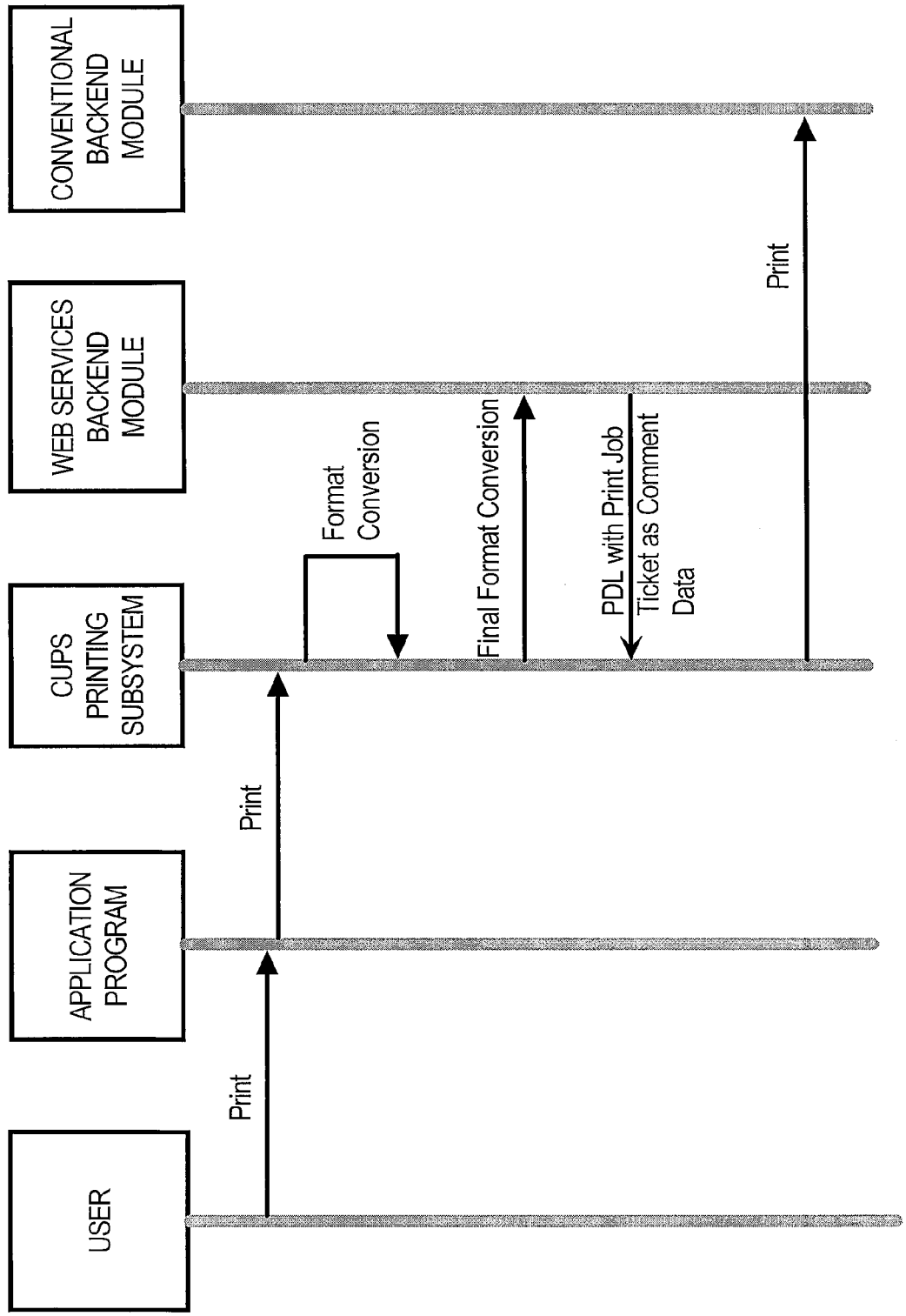
FIG. 17 is a flow diagram that depicts embedding print job ticket into PDL of print data.

FIG. 17 is a flow diagram that depicts embedding print job ticket 634 into PDL of print data 632 according to one embodiment of the invention. A user initiates a printing process via application program 612. Application program 612 transmits a print command to CUPS printing subsystem 616 which converts print job ticket 634 into PDL comment data and provides the converted data to Web services backend module 620. Web services backend module 620 performs any final formatting of the PDL comment data that contains print job ticket 634 and generates print data 632. Web services backend module 620 provides the print data 632 containing print job ticket 634 in PDL comment data to CUPS printing subsystem 616 which in turn provides print data 632 to a conventional backend module, for example a Socket backend module. The conventional backend module processes print data 632.

IX. Implementation Mechanisms

According to one embodiment of the invention, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 18:
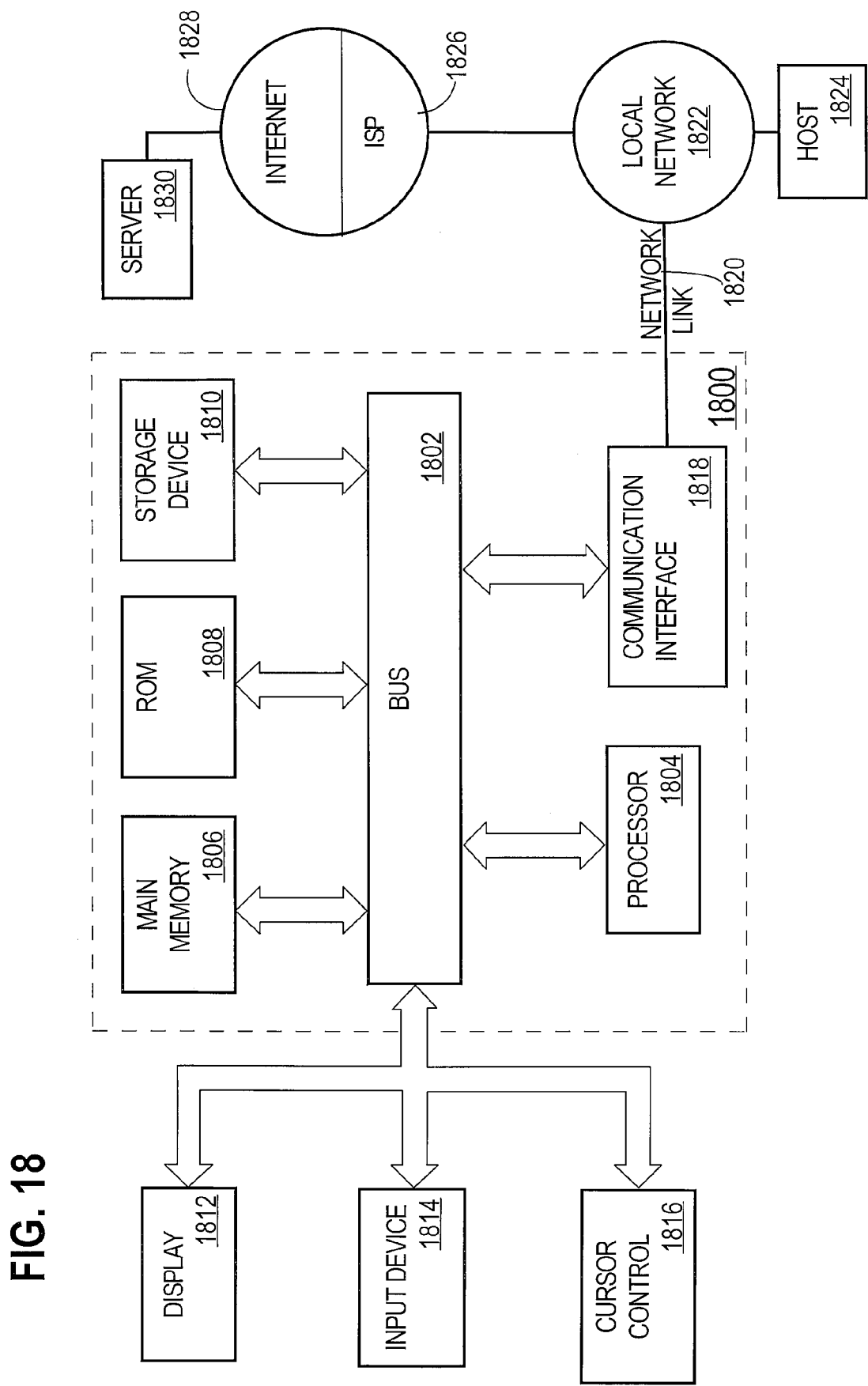
FIG. 18 is a block diagram of a computer system on which embodiments of the invention may be implemented.

FIG. 18 is a block diagram that depicts an example computer system 1800 upon which embodiments of the invention may be implemented. Computer system 1800 includes a bus 1802 or other communication mechanism for communicating information, and a processor 1804 coupled with bus 1802 for processing information. Computer system 1800 also includes a main memory 1806, such as a random access memory (RAM) or other dynamic storage device, coupled to bus 1802 for storing information and instructions to be executed by processor 1804. Main memory 1806 also may be used for storing temporary variables or other intermediate information during execution of instructions to be executed by processor 1804. Computer system 1800 further includes a read only memory (ROM) 1808 or other static storage device coupled to bus 1802 for storing static information and instructions for processor 1804. A storage device 1810, such as a magnetic disk or optical disk, is provided and coupled to bus 1802 for storing information and instructions.

Computer system 1800 may be coupled via bus 1802 to a display 1812, such as a cathode ray tube (CRT), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane.

Computer system 1800 may implement the techniques described herein using customized hard-wired logic, one or more ASICs or FPGAs, firmware and/or program logic or computer software which, in combination with the computer system, causes or programs computer system 1800 to be a special-purpose machine. According to one embodiment of the invention, those techniques are performed by computer system 1800 in response to processor 1804 executing one or more sequences of one or more instructions contained in main memory 1806. Such instructions may be read into main memory 1806 from another computer-readable medium, such as storage device 1810. Execution of the sequences of instructions contained in main memory 1806 causes processor 1804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 1800, various computer-readable media are involved, for example, in providing instructions to processor 1804 for execution. Such a medium may take many forms, including but not limited to, non-volatile media and volatile media. Non-volatile media includes, for example, optical or magnetic disks, such as storage device 1810. Volatile media includes dynamic memory, such as main memory 1806. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 1804 for execution. For example, the instructions may initially be carried on a magnetic disk of a remote computer. The remote computer can load the instructions into its dynamic memory and send the instructions over a telephone line using a modem. A modem local to computer system 1800 can receive the data on the telephone line and use an infra-red transmitter to convert the data to an infra-red signal. An infra-red detector can receive the data carried in the infra-red signal and appropriate circuitry can place the data on bus 1802. Bus 1802 carries the data to main memory 1806, from which processor 1804 retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card or a modem to provide a data communication connection to a corresponding type of telephone line. As another example, communication interface 1818 may be a local area network (LAN) card to provide a data communication connection to a compatible LAN. Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818. The received code may be executed by processor 1804 as it is received, and/or stored in storage device 1810, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for printing to a Web Service-enabled printing device, comprising:

retrieving, from the Web Service-enabled printing device, printing device capabilities data that describes current capabilities of the Web Service-enabled printing device and includes default print job ticket data that specifies a set of default print job settings values for the Web Service-enabled printing device;

generating, based upon both the printing device capabilities data, a printer description file that conforms to the PostScript Printer Description (PPD) file format and includes print job ticket generation information that includes one or more default print job settings values from the set of default print job settings values included in the printing device capabilities data;

generating a print job ticket based on the print job ticket generation information included in the printer description file that conforms to the PPD file format, wherein the print job ticket specifies one or more print job settings values that are to be used to process a print job on the Web Service-enabled printing device and wherein the one or more print job settings values include at least one of the one or more default print job settings values from the set of default print job settings values included in the printing device capabilities data; and submitting the print job ticket to the Web Service-enabled printing device.

2. The computer-implemented method as recited in claim 1, wherein the retrieving printing device capabilities data is performed using Web Service discovery protocol and comprises:
sending a Web Service probe message to the Web Service-enabled printing device at the Web Service-enabled printing device's IP address;
receiving, from the Web Service-enabled printing device, a Web Service port number;
requesting, from the Web service-enabled printing device, printing device capabilities data by using the Web Service protocol to communicate with the Web Service-enabled printing device on a port on the Web Service-enabled printing device with the Web Service port number; and
receiving, from the Web Service-enabled printing device, the printing device capabilities data.

3. The computer-implemented method as recited in claim 1, wherein the print job ticket generation information included in the printer description file includes PPD extension information that includes one or more of a tree structure, a port number or a protocol name.

4. The computer-implemented method as recited in claim 1, wherein:
the printer description file is used to generate a user interface;
the user interface displays the capabilities of the Web Service-enabled printing device; and
user-specified print settings are received through the user interface.

5. The computer-implemented method as recited in claim 4, wherein generating a print job ticket further comprises generating the print job ticket based on the user-specified print settings.

6. The computer-implemented method as recited in claim 5, wherein:
the user-specified print settings are included in print data,
generating a print job ticket based on the user-specified print settings comprises generating the print job ticket based on print data, and
the computer-implemented method further comprises submitting the print data to the Web Service-enabled printing device.

7. The computer-implemented method as recited in claim 6, wherein the print job ticket and the print data are submitted to the Web Service-enabled printing device as a single print job.

8. The computer-implemented method as recited in claim 7, wherein the print job ticket is included as PDL comment data in the print data.

9. The computer-implemented method as recited in claim 1, wherein the set of default print job settings values for the Web Service-enabled printing device includes default print jobs settings values for all of the features currently supported by the Web Service-enabled printing device.

10. A non-transitory computer-readable medium for printing to a Web Service-enabled printing device, the non-transitory computer-readable medium storing instructions which, when processed by one or more processors, causes:
retrieving, from the Web Service-enabled printing device, printing device capabilities data that describes current capabilities of the Web Service-enabled printing device and includes default print job ticket data that specifies a set of default print job settings values for the Web Service-enabled printing device;
generating, based upon both the printing device capabilities data, a printer description file that conforms to the PostScript Printer Description (PPD) file format and includes print job ticket generation information that includes one or more default print job settings values from the set of default print job settings values included in the printing device capabilities data;
generating a print job ticket based on the print job ticket generation information included in the printer description file that conforms to the PPD file format, wherein the print job ticket specifies one or more print job settings values that are to be used to process a print job on the Web Service-enabled printing device and wherein the one or more print job settings values include at least one of the one or more default print job settings values from the set of default print job settings values included in the printing device capabilities data; and
submitting the print job ticket to the Web Service-enabled printing device.

11. The non-transitory computer-readable medium as recited in claim 10, wherein the retrieving printing device capabilities data is performed using Web Service discovery protocol and comprises:
sending a Web Service probe message to the Web Service-enabled printing device at the Web Service-enabled printing device's IP address;
receiving, from the Web Service-enabled printing device, a Web Service port number;
requesting, from the Web service-enabled printing device, printing device capabilities data by using the Web Service protocol to communicate with the Web Service-enabled printing device on a port on the Web Service-enabled printing device with the Web Service port number; and
receiving, from the Web Service-enabled printing device, the printing device capabilities data.

12. The non-transitory computer-readable medium as recited in claim 10, wherein the print job ticket generation information included in the printer description file includes PPD extension information that includes one or more of a tree structure, a port number or a protocol name.

13. The non-transitory computer-readable medium as recited in claim 10, wherein:
the printer description file is used to generate a user interface;
the user interface displays the capabilities of the Web Service-enabled printing device; and
user-specified print settings are received through the user interface.

14. The non-transitory computer-readable medium as recited in claim 13, wherein generating a print job ticket further comprises generating the print job ticket based on the user-specified print settings.

15. The non-transitory computer-readable medium as recited in claim 14, wherein:
the user-specified print settings are included in print data,
generating a print job ticket based on the user-specified print settings comprises generating the print job ticket based on print data, and
the non-transitory computer-readable medium further comprises additional instructions which, when processed by the one or more processors, causes submitting the print data to the Web Service-enabled printing device.

16. The non-transitory computer-readable medium as recited in claim 15, wherein the print job ticket and the print data are submitted to the Web Service-enabled printing device as a single print job.

17. The non-transitory computer-readable medium as recited in claim 16, wherein the print job ticket is included as PDL comment data in the print data.

18. The non-transitory computer-readable medium as recited in claim 16, wherein the set of default print job settings values for the Web Service-enabled printing device includes default print jobs settings values for all of the features currently supported by the Web Service-enabled printing device.

19. An apparatus for printing to a Web Service-enabled printing device, the apparatus comprising a memory storing instructions which, when processed by one or more processors, causes:

retrieving, from the Web Service-enabled printing device, printing device capabilities data that describes current capabilities of the Web Service-enabled printing device and includes default print job ticket data that specifies a set of default print job settings values for the Web Service-enabled printing device;

generating, based upon both the printing device capabilities data, a printer description file that conforms to the PostScript Printer Description (PPD) file format and includes print job ticket generation information that includes one or more default print job settings values from the set of default print job settings values included in the printing device capabilities data;

generating a print job ticket based on the print job ticket generation information included in the printer description file that conforms to the PPD file format, wherein the print job ticket specifies one or more print job settings values that are to be used to process a print job on the Web Service-enabled printing device and wherein the one or more print job settings values include at least one of the one or more default print job settings values from the set of default print job settings values included in the printing device capabilities data; and submitting the print job ticket to the Web Service-enabled printing device.

20. The apparatus as recited in claim 19, wherein the retrieving printing device capabilities data is performed using Web Service discovery protocol and comprises:

sending a Web Service probe message to the Web Service-enabled printing device at the Web Service-enabled printing device's IP address;

receiving, from the Web Service-enabled printing device, a Web Service port number;

requesting, from the Web service-enabled printing device, printing device capabilities data by using the Web Service protocol to communicate with the Web Service-enabled printing device on a port on the Web Service-enabled printing device with the Web Service port number; and receiving, from the Web Service-enabled printing device, the printing device capabilities data.

\* \* \* \* \*

UNITED STATES PATENT AND TRADEMARK OFFICE
CERTIFICATE OF CORRECTION

Page 1 of 1

PATENT NO. : 8,773,687 B2
APPLICATION NO. : 12/399799
DATED : July 8, 2014
INVENTOR(S) : Liu It is certified that error appears in the above-identified patent and that said Letters Patent is hereby corrected as shown below:

In the Claims

Column 20:

Claim 1, line 49, delete "both"

Column 21:

Claim 10, line 66, delete "both"

Column 23:

Claim 19, line 19, delete "both"

Signed and Sealed this
Seventh Day of October, 2014

Michelle K. Lee
*Deputy Director of the United States Patent and Trademark Office*